United States Patent [19]

Repperger et al.

[11] Patent Number: 5,629,848

[45] Date of Patent: May 13, 1997

[54] SPATIAL DISORIENTATION DETECTOR

[75] Inventors: D. W. Repperger, Dayton; W. B. Albery, Spring Valley, both of Ohio

[73] Assignee: The United States of America as represented by the Secretary of the Air Force, Washington, D.C.

[21] Appl. No.: 994,200

[22] Filed: Dec. 4, 1992

[51] Int. Cl.[6] .................................................. G06F 7/70
[52] U.S. Cl. ........................ 364/424.06; 364/424.012; 340/980; 340/963; 340/970; 340/967; 434/55; 434/59; 73/178 T
[58] Field of Search .......................... 364/424.66, 578, 364/439, 433; 340/963, 945, 970, 965, 959, 960, 967, 980, 576; 434/55, 59; 73/178 T

[56] References Cited

U.S. PATENT DOCUMENTS

| | | | |
|---|---|---|---|
| H1039 | 4/1992 | Tripp, Jr. et al. | 128/206.28 |
| 4,751,662 | 6/1988 | Crosbie | 364/578 |
| 4,814,764 | 3/1989 | Middleton | 340/967 |
| 4,939,513 | 7/1990 | Vermillion et al. | 340/970 |
| 5,001,476 | 3/1991 | Vermilion et al. | 340/970 |
| 5,021,982 | 6/1991 | Crosbie et al. | 364/578 |
| 5,057,834 | 10/1991 | Nordstrom | 340/963 |
| 5,075,685 | 12/1991 | Vermilion et al. | 340/970 |
| 5,138,555 | 8/1992 | Albrecht | 364/424.06 |

*Primary Examiner*—Kevin J. Teska
*Assistant Examiner*—Jacques H. Louis-Jacques
*Attorney, Agent, or Firm*—Gerald B. Hollins; Thomas L. Kundert

[57] ABSTRACT

A spatial disorientation detector system capable of warning a pilot of potentially disorienting flight conditions in response to Kalman filter modeling of human response characteristics. The Kalman filter models are representative of human semicircular canal and otolith responses and are capable of more accurate prediction of actual pilot disorientation conditions than are systems which respond with simple magnitude measurement of disorientation stress. Examples of disorienting environments are also disclosed.

12 Claims, 17 Drawing Sheets

HEAD COORDINATES ≡ (xhd, yhd, zhd)
CANAL COORDINATES ≡ (xc, yc, zc)
OTOLITH COORDINATES ≡ (xo, yo, zo)

SPATIAL DISORIENTATION DETECTOR

RIGHTS OF THE GOVERNMENT

The invention described herein may be manufactured and used by or for the Government of the United States for all governmental purposes without the payment of any royalty.

BACKGROUND OF THE INVENTION

This invention relates to the field of aircraft pilot assistance systems and especially to systems of the pilot incapacity detecting character.

Many accidents involving commercial and military aircraft appear to be related to pilot spatial disorientation (SD) encounters and a resulting defective response by the pilot. There is however, presently no known device which can accurately detect disorientation situations for an aircraft pilot. Three types of SD have been identified including Type I (unrecognized), Type II (recognized), and Type III (incapacitating).

The purpose of the present invention is to provide a device which can alert a pilot to a potentially disorienting situation as may be encountered in an unusual flight trajectory in an aircraft. The pilot may not be aware of the fact that he/she is disoriented as this problem often occurs in certain types of linear and angular acceleration profiles that an aircraft can be exposed to. A device according to the present invention will alert the pilot to a potentially disorienting situation by, for example, lighting a warning light on the cockpit, displaying a horizon reference indication inside the cockpit, adding motion information via a peripheral display, or possibly by activating a noise indication of where the earth's gravity vector points. All of these responses are, of course, an effort to alert the pilot to the fact that he/she may be disoriented.

In responding, the pilot has the option of turning off the alarm device at any time or possibly allowing an automatic flight system to assume control of the aircraft. Interaction of the pilot with the present device will also allow the pilot to look outside the plane, or study his instruments more carefully to obtain a better estimate of the true orientation (attitude) of the aircraft.

The patent art includes several examples of inventions which are of general interest with respect to the present disorientation detection invention. This patent art includes U.S. Pat. No. 4,814,764 issued to R. Middleton and concerned with a system for warning an aircraft pilot of a high yaw flight condition a condition such as may also entail a large rotation of the aircraft about its roll axis during yaw correction. Since the Middleton invention is concerned only with the yaw condition and not with the physiological condition related disorientation phenomenon, a ready distinction between the present invention and the Middleton invention is possible.

Also included in the patent art of interest is U.S. Pat. No. 4,939,513 issued to N. S. Paterson et al and concerned with the issuing of a warning to a pilot when the combination of low level flight and a dangerous flight profile exists. The combination of low altitude roll and a fast descent rate are particularly considered threatening to the safety of the aircraft in Paterson et al. Since the Paterson et al invention also does not consider the physiological phenomenon of spatial disorientation, a ready distinction between this invention and the system of the present invention is apparent.

The patent art of background interest also includes U.S. Pat. No. 5,001,476 issued to E. E. Vermillion et al and concerned with a system for warning the pilot in a tactical aircraft of a dangerous flight profile during either a tactical maneuvering sequence or alternately during routine segments such as take off and landing. The Vermillion et al system is therefore also concerned with aircraft flight profile rather than physiological conditions and a ready distinction between the present invention and the Vermillion et al invention is apparent.

The patent art of background interest also includes U.S. Pat. No. 5,057,834 issued to K. L. Nordstrom and concerned with a system for monitoring the steering performance of a vehicle operator including an aircraft pilot. In the Nordstrom invention every new steering controlled deflection in the opposite direction to one immediately preceding is considered and the time value for a steering controlled deflection is calculated. This time value is compared with a predetermined time limit value in order that an excessive time indicate an abnormal steering performance as may be caused by a lowered degree of consciousness. An alarm signal or an automatic steering arrangement may be actuated. Since the Nordstrom invention is also not concerned with physiological aspects of spatial disorientation a ready distinction between the present invention and the Nordstrom apparatus is possible.

SUMMARY OF THE INVENTION

In the present invention a Kalman apparatus produces a state estimate of both the true position and orientation and also state estimates of the pilot perceived position and orientation of the aircraft. When an error of sufficient magnitude occurs between the filter's true value and perceived estimate, a warning to the pilot is provided.

An object of the present invention is therefore to provide a spatial disorientation warning apparatus for an aircraft pilot.

Another object of the invention is to provide a Kalman filter estimate of human physiological response to disorienting aircraft flight profile conditions.

Another object of the invention is to provide a disorientation warning in response to a combination of angular and linear acceleration stimuli.

Another object of the invention is to provide a pilot controllable warning arrangement for the onset of disorientation conditions.

Another object of the invention is to provide a disorientation warning system that is based upon both the otolith and semicircular canal responses of human physiology.

Additional objects and features of the invention will be understood from the following description and claims and the accompanying drawings.

These and other objects of the invention are achieved by an airborne spatial disorientation apparatus for protecting an aircrew member from the effects of aircraft maneuvering related spatial disorientation, said apparatus comprising the combination of:

first means for computing electrical signals representing true position and orientation of the aircraft with respect to an earth reference; second means, inclusive of mathematical models for a plurality of human position and orientation perceiving functions, for computing electrical signals representing aircrew member perceived position and orientation of the aircraft; means for comparing differences between the true position and perceived position and the true orientation and perceived orientation electrical signals with predetermined difference magnitude limits therefor; and means for informing the aircrew member of instances when the predetermined difference magnitude limits are exceeded.

DETAILED DESCRIPTION

Figure 1:
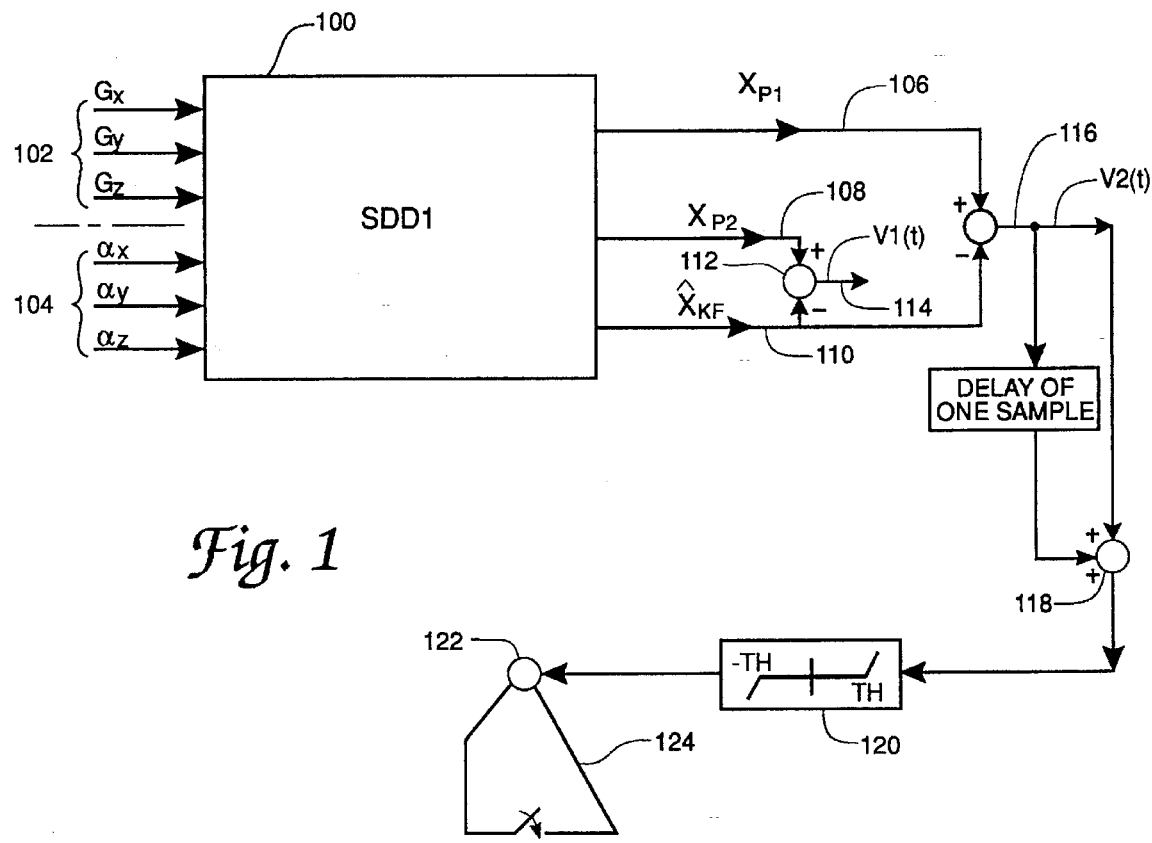
FIG. 1 shows a spatial disorientation detector according to the present invention in block diagram form.
Figure 2:
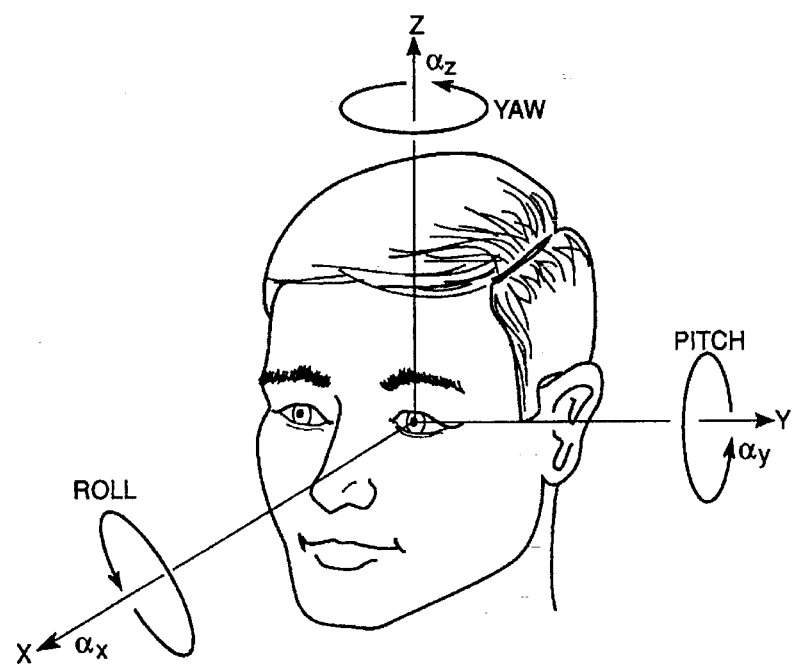
FIG. 2 shows a definition of axis convention for linear and angular motion.

FIG. 1 of the drawings illustrates the signals attending a spatial disorientation detector (SDD), 100. The input signals to the SDD 100 include the three linear acceleration vectors Gx, Gy, Gz shown at 102. These vectors represent the linear accelerations experienced at a point in the head centered coordinate system of FIG. 2. The three angular accelerations ($\alpha x$, $\alpha y$, $\alpha z$) also appear at 104 in the FIG. 1 coordinate system and are shown in FIG. 2. These vectors represent the cyclopian coordinate system described in reference [4] in appendix B herein. One output of the SDD 100 in FIG. 1 is the signal xp1(t) 106 which is a vector describing the true position and orientation of the pilot/aircraft. The second output xp2(t) at 108 is the perceived position and orientation of the pilot/aircraft. The third output of the SDD is the Kalman filter estimate $\hat{x}KF$ of xp2 (the perceived state) at 110 which is described in more detail below.

Figure 26A:
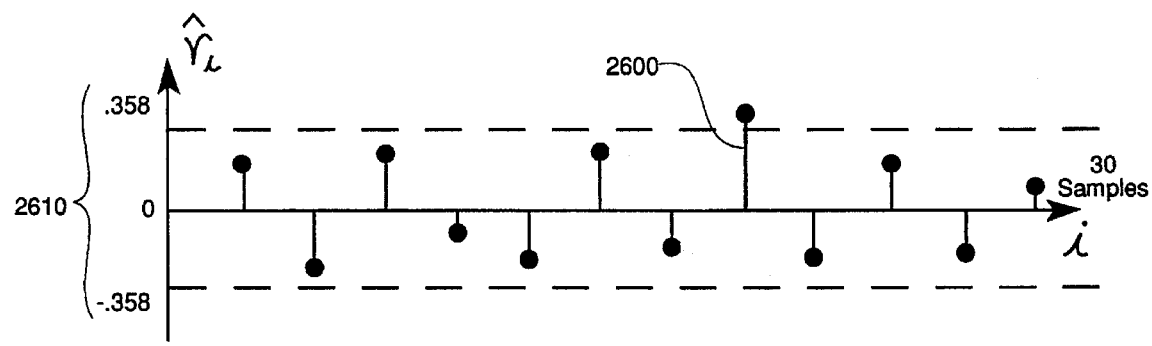
FIG. 26a shows a plot of $\bar{r}i$ for white random residuals.
Figure 26B:
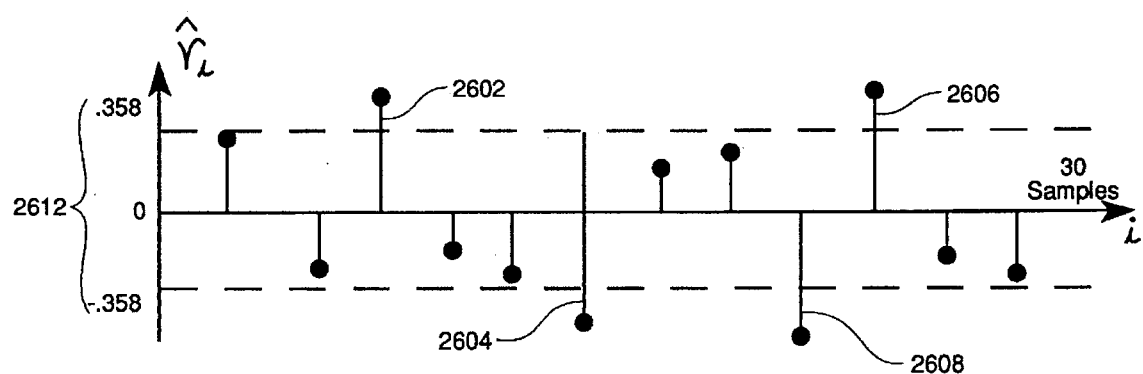
FIG. 26b shows a plot of $\bar{r}i$ for a non-random residual condition.

The difference between xp2 and $\hat{x}KF$ as is calculated at 112 and output at 114 is a random white noise source at 114 called residuals v1(t). FIG. 26b shows a plot of $\bar{r}i$ for non white residuals; $\bar{r}i$ is a normalized form of these residuals which is described in the Appendix. A second set of residuals at 116 (v2(t)) is the difference between xp1 and $\hat{x}KF$. If $\hat{x}KF$ and xp2 match (i.e. they have the same visual-vestibular information), then v2(t) does not differ in any statistical sense from v1(t) and it is also a random white noise source. The purpose of the correlator 118 in FIG. 1 is to correlate v2(t) with itself. If v2(t) is a white noise source, then the output of the correlator is approximately zero. If, however, v2(t) is not a random signal and contains a component which, when correlated with itself, yields a high positive output signal, then the correlator output will have sufficient strength to produce a possible pilot alerting action.

Figure 3:
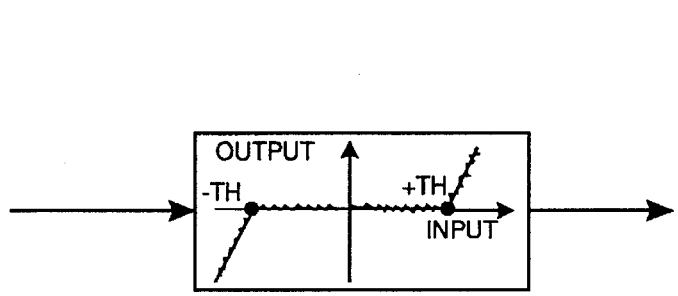
FIG. 3 shows the input to output characteristics of a threshold detector.
Figure 4:
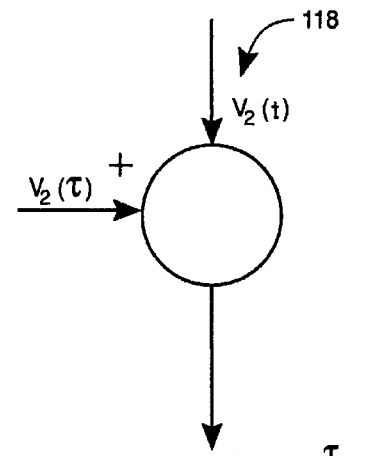
FIG. 4 shows the input to output characteristics of a signal correlator device.

The output of the correlator 118 is evaluated in a threshold detector 120 which produces no output unless the output of the correlator is above the threshold level |TH|. If the output of the correlator is above the threshold level TH, an alarm indicator 122 warns the pilot or aircrew member of a potentially disorienting situation. The pilot can then elect to turn off the alarm manually as indicated by the switched loop 124. The characteristics of the threshold detector 120 are described in FIG. 3. The value TH is selected experimentally and typical values are presented below. FIG. 4 illustrates the correlator 118 and its operation. Correlation of this nature can be implemented in computers or in electrical circuits; Appendix A describes one such correlator device.

To describe operation of the FIG. 1 spatial disorientation detector stage or SDD1 100 block, it is desirable to first consider several fundamental concepts including the basic properties of the human motion and visual sensing systems as disclosed in reference [1], the conflict theory which describes the mechanism of disorientation in references [2] and [3], the models for the illusions to be tested via computer simulation in reference [4], and the technical basis supporting the Kalman filter estimator in reference [5].

Figure 5A:
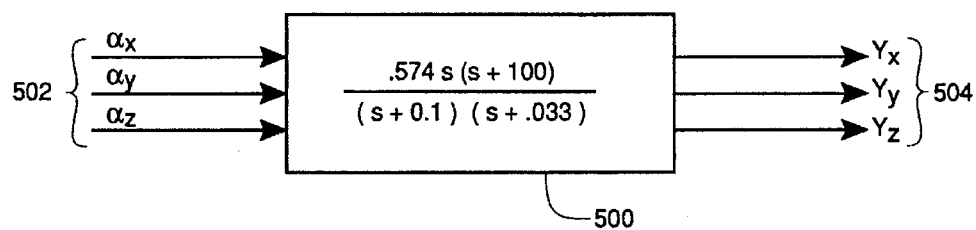
FIG. 5a shows the dynamic characteristics of a human semicircular canal response.

FIG. 5a, therefore, illustrates a model of the semicircular canals and afferent dynamics in the visual-motion system which governs the human disorientation system. These canals have as inputs 502 the angular accelerations αx, αy, and αz. In each axis the output afferent firing rate of the semicircular canals at 504 is approximated by the second order transfer functions illustrated in FIG. 5a. This sensor only responds to angular acceleration inputs.

Figure 5B:
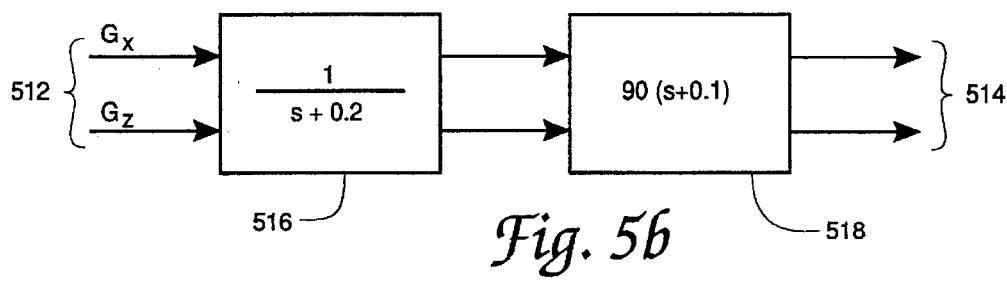
FIG. 5b shows the dynamic response characteristics of the human otolith system.

FIG. 5b illustrates a model of the human otolith organs which respond to linear acceleration inputs. In both the Gx and Gz axes, each channel has the form of the FIG. 5b first order system. In actuality, the otoliths respond also to linear Gy acceleration, however, aircraft rarely achieve this lateral type of acceleration and, for simplicity, such response is not included in the FIG. 5b model. Thus for the otoliths, linear accelerations are input at 512 and the afferent firing rate is the output at 514 for both the Gx and Gz axes. The otolith mechanical model is shown at 516 and the afferent processing at 518 in the FIG. 5b is the otolith model dynamics.

Figure 5C:
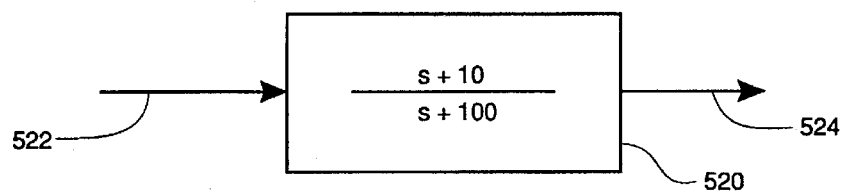
FIG. 5c shows the input to output characteristics of the human tactile system.

FIG. 5c illustrates a tactile model 520 which is useful to describe the relationship between specific normal force i.e., the Gz input at 522 on the body seat and how this signal is converted to an output signal at 524, a signal to the central processor or brain of the pilot. There also exists another form of proprioception similar to the tactile model resulting from sensing of head movement [1], [6]. This type of sensing and its inverted pendulum model, however, is inherently unstable and cannot be used with a Kalman filter as employed herein.

Kalman Filter Implementation

It is desired to use a Kalman filter [5] to implement the SDD of FIG. 1. A Kalman filter is selected for the presently described system for the following reasons:

1. It is the best linear least squares estimator based on known empirical data,

2. It can incorporate models for both internal plant noise and output or measurement noise and also other noise sourced unmodeled effects in the system, 3. It has achieved applicability and success in other fields, and hence is a well documented concept.

To describe operation of a Kalman filter a plant equation is considered to describe the perceived state as viewed by the pilot, this equation is of the form:

$$\dot{x}p2 = A\ xp2(t) + B\ u(t) + Z(t) \qquad (1)$$

where the dot indicates time differentiation and xp2(t) is a 9×1 column vector which can be described as:

$$xp2 = \text{col}\ [x1, x2, x3, x4, x5, x6, x7, x8, x9] \qquad (2)$$

The states x1 and x2 of the vector xp2 represent the semicircular canals for the αx input, x3 and x4 represent the semicircular canals for the αy input, and x5 and x6 represent the semicircular canals for the αz input. The states x7 and x8 describe the dynamic response of the otoliths in the linear Gx and Gz direction. The last state, x9, represents the state for the tactile model described in FIG. 5c.

In equation (1) the 9×9 matrix A, a 9×6 matrix B, and a 9×1 1 column vector Z(t) need to be described in further detail. To model the states x1 and x2 the transfer function in FIG. 5a can be written (e.g. for αx, the first semicircular canal):

$$\frac{Y\text{out}}{\alpha x} = \frac{.574\ s(s+100)}{(s+0.1)(s+.033)} = .574 + \frac{57.35}{s^{**}2 + .133s + .0033} \qquad (3)$$

If Y out = Y1+Y2, where:

$$Y1 = 0.574\ \alpha x \qquad (4)$$

and:

$$\frac{Y2}{\alpha x} = \frac{57.4}{s^{**}2 + .133s + .0033} \qquad (5)$$

then the following ordinary differential equation results:

$$\ddot{Y}_2 + 0.133\ \dot{Y}2 + 0.0033\ Y2 = 57.4\ \alpha x. \qquad (6)$$

If state variables are chosen as:

$$\dot{x}1 = x2 \qquad (7)$$

$$\dot{x}2 = -0.133 x2 - 0.0033 x1 \qquad (8)$$

Then that part of the A matrix in equation (1) can be written as:

$$\dot{x} = A\ x + B\ \alpha x \qquad (9)$$

$$\text{where}\ A = \begin{bmatrix} 0, & 1 \\ -.0033, & -.133 \end{bmatrix} \qquad (10)$$

$$\text{and}\ B = \begin{bmatrix} 0 \\ 57.4 \end{bmatrix} \qquad (11)$$

This procedure is repeated for the first 6 states of the A matrix to include all three semicircular canal dynamics. Note after Y2 is determined then:

$$Y = Y1 + Y2 \qquad (12)$$

where Y1 is given in equation (4).

To include the model of the otoliths (the states x7 and x8 of the perceived state vector xp2(t)), the transfer function in FIG. (5b) can be written (e.g. for the Gx input):

$$\frac{Y}{Gx} = \frac{90(s+0.1)}{s+0.2} = 90 - \frac{9}{s+0.2} \qquad (13)$$

Now let $$Y\ \text{total} = Y1 + Y2 \qquad (14)$$

where:

$$Y2 = 90\ Gx \qquad (15)$$

and Y1 satisfies:

$$\frac{Y1}{Gx} = \frac{-9}{s+0.2} \qquad (16)$$

or $$\dot{Y}1 + 0.2 Y1 = -9 Gx \qquad (17)$$

If the state variable x7 is selected as x7=Y1, then the relationship:

$$\dot{x}7 = -0.2 \times 7 - 9 Gx \qquad (18)$$

becomes part of the state equation. Since pilots of most aircraft are affected by motion in the Gx and Gz axes, the otoliths are modeled as responding in only the Gx and Gz axes, this completes the x7 and x8 state description.

For the last state variable (tactile) the transfer function from Y to Gz is given in FIG. (5c) as:

$$\frac{Y}{Gz} = \frac{s+10}{s+100} = 1 - \frac{90}{s+100} \quad (19)$$

Again letting Y=Y1+Y2, where:

$$Y2 = Gz \quad (20)$$

and Y1 satisfies:

$$\frac{Y1}{Gz} = \frac{-90}{s+100} \quad (21)$$

yields the ordinary differential equation:

$$\dot{Y}1 + 100 Y1 = -90 Gz \quad (22)$$

Thus the choice of state variable x9=Y1 yields:

$$\dot{x}9 = -100 x9 - 90 Gz \quad (23)$$

In summary, the A and B matrices of the plant equation xp2 specified in equation (1) can be given by:

$$A = \begin{bmatrix} 0, & 1, & 0, & 0, & 0, & 0, & 0, & 0, & 0 \\ -.0033, & -.133, & 0, & 0, & 0, & 0, & 0, & 0, & 0 \\ 0, & 0, & 0, & 1, & 0, & 0, & 0, & 0, & 0 \\ 0, & 0, & -.0033, & -.133, & 0, & 0, & 0, & 0, & 0 \\ 0, & 0, & 0, & 0, & 0, & 1, & 0, & 0, & 0 \\ 0, & 0, & 0, & 0, & -.0033, & -.133, & 0, & 0, & 0 \\ 0, & 0, & 0, & 0, & 0, & 0, & -.2, & 0, & 0 \\ 0, & 0, & 0, & 0, & 0, & 0, & 0, & -.2, & 0 \\ 0, & 0, & 0, & 0, & 0, & 0, & 0, & 0, & -100 \end{bmatrix} \quad (24)$$

$$B = \begin{bmatrix} 0, & 0, & 0, & 0, & 0, & 0 \\ .574, & 0, & 0, & 0, & 0, & 0 \\ 0, & 0, & 0, & 0, & 0, & 0 \\ 0, & .574, & 0, & 0, & 0, & 0 \\ 0, & 0, & 0, & 0, & 0, & 0 \\ 0 & 0 & .574, & 0, & 0 & 0 \\ 0, & 0, & 0, & -9, & 0, & 0 \\ 0, & 0, & 0, & 0, & -9, & 0 \\ 0, & 0, & 0, & 0, & 0, & -90 \end{bmatrix} \quad (25)$$

where the input vector u (6×1) is defined as:

$$u = \mathrm{col}\,[\alpha x, \alpha y, \alpha z, Gx, Gy, Gz] \quad (26)$$

The noise vector Z (t) is a 9×1 column vector that replicates disturbances in the plant noise. To estimate xp2, a Kalman filter is constructed of the form:

$$\dot{\hat{x}}KF = A\,\hat{x}KF + K[y(t) - H\,\hat{x}KF] \quad (27)$$

$$y(t) = H(t) xp2(t) + n(t) \quad (28)$$

where $\hat{x}KF$ is an 9×1 column vector Kalman filter estimator of xp2, y(t) is the observed output measurements, K is the 9×9 Kalman grain matrix, y(t) is the 9×1 set of output measurements with H(t)=I, meaning all states can be measured, and n(t) represents the output noise associated with the y(t) measurements. The characteristics of the noise, n(t) and Z(t), are given as follows:

$$E\{Z(t)Z^T(t)\} = Q \quad (29)$$

$$E\{n(t)n^T(t)\} = R \quad (30)$$

where E {.} is the expectation operator in a statistical sense and Q and R are 6×6 and 9×9 covariance matrices, respectively. The Kalman gain K is specified by:

$$K = P\,R^{-1} \quad (31)$$

and the 9×9 P matrix satisfies the Riccati type equation for covariance propagation:

$$\dot{P} = A\,P + P\,A - P\,R\,P + B\,Q\,B \quad (32)$$

Thus $\hat{x}KF$ given in equation (27) specifies the best linear least squares estimate of xp2 subject to the existing data available for measurement. Note that $\hat{x}KF$ only describes the estimate of a perceived variable xp2, i.e. $\hat{x}KF$ is not the actual output desired, but it must be calculated first because it represents a perceived variable. Recall from FIGS. (5a–c) that the desired y outputs, can be estimated as follows:

$$\left.\begin{array}{l} Yc1 = x1 + .574\,\alpha x \\ Yc2 = x3 + .574\,\alpha x \\ Yc3 = x5 + .574\,\alpha x \end{array}\right\} \text{canals} \quad \begin{array}{l}(33)\\(34)\\(35)\end{array}$$

$$\left.\begin{array}{l} Yo1 = x7 + 90\,Gx \\ Yo2 = x8 + 90\,Gz \end{array}\right\} \text{otoliths} \quad \begin{array}{l}(36)\\(37)\end{array}$$

$$YT = x9 + Gz]\ \text{tactile} \quad (38)$$

Thus, these relationships are used to obtain the actual sensor's response. In reference [4] Young describes two disorientation illusions of interest; the elevator illusion and the oculogyral illusion. These illusions for prediction examples can easily be tested and are first described to illustrate the mechanism of their origin.

The first illusion to be considered via the SDD device depends only on semicircular canal stimulation and no stimulation from the otoliths. This first illusion is called the Oculogyral Illusion. It can easily be produced in a laboratory as is demonstrated in FIG. 6 where as the subject 600 sits on a chair and is subjected to yaw rotation 602 of a constant angular velocity Wy with his eyes closed. All other sensory inputs including tactile, proprioceptive and auditory cues are assumed to be non existent. The semicircular canals respond only to αy=dWy/dt and after a while do not perceive this strictly constant Wy rotation. This occurs after about 25 seconds when the semicircular canals demonstrate a steady-state action potential frequency due to their sensitivity to only αy (and αy has been zero for 25 seconds). Thus with the eyes closed, the subject perceives no angular rotation because the canals respond to changes in angular velocity, or acceleration, and once a constant velocity is achieved, the fluid in the canals comes to rest and there is no longer a fluid force on the cupula, the force to axon or nerve transducer in the canal. After 30 seconds, however the subject 600 opens his eyes and receives a severe conflict signal due to a moving visual field which contradicts his motion sensing of no apparent rotation.

Figure 6:
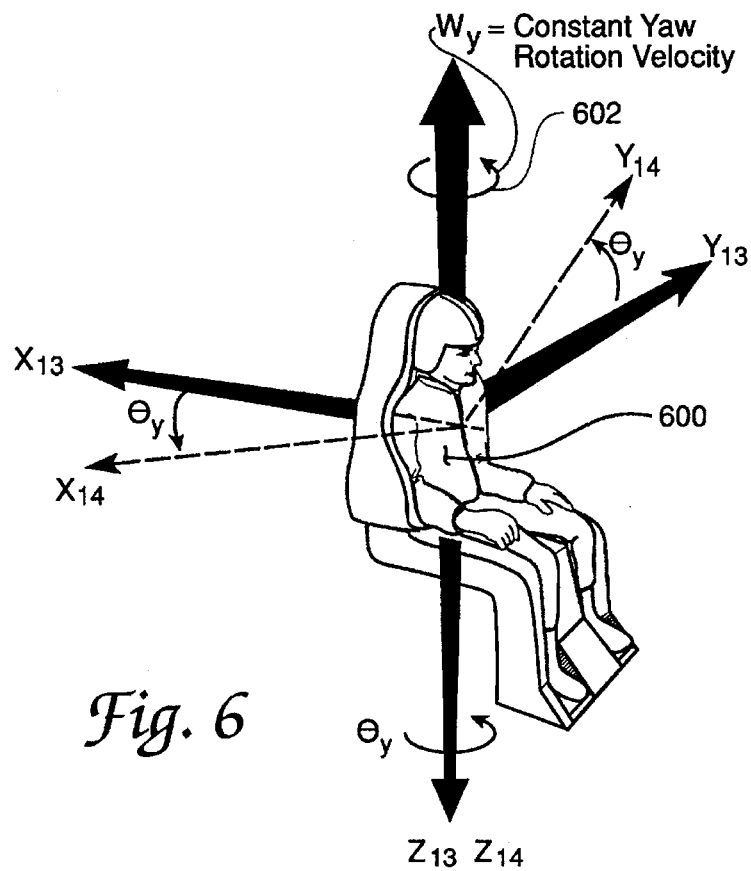
FIG. 6 shows the angles and directions associated with yaw rotation of a seated test subject.

This FIG. 6 illusion is a desirable test because it involves responses from the semicircular canals and no otolith stimulation occurs. The assumption is made, as in reference [7], that the semicircular canals and the otoliths are located at the center of the Cyclopian or head centered coordinate system of FIG. 2. In actuality, there exists a pair of canals and a pair of otoliths; however, as in reference [7], it is assumed that these are located in the center of the head centered coordinate system and act as one system.

Figure 7:
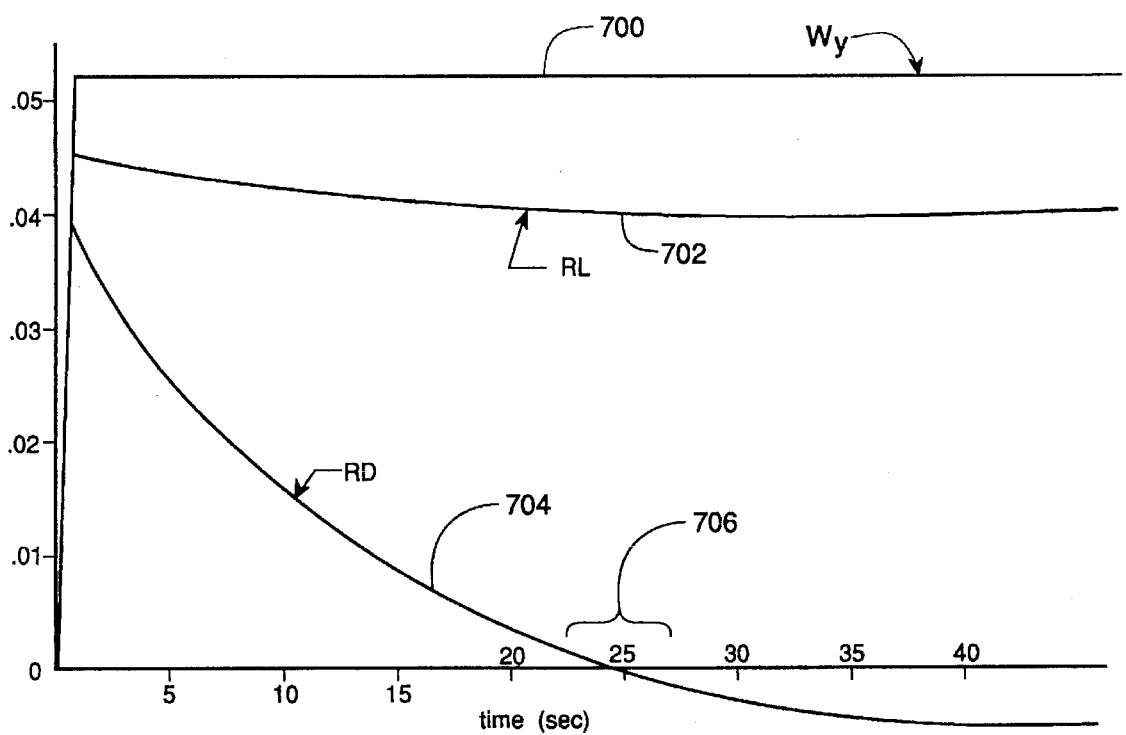
FIG. 7 shows a subject's response to perception of angular yaw motion in light and darkness.

FIG. 7, as is discussed in reference [7], illustrates the responses from a subject's perception of this motion. The stimulus curve 700 is the Wy associated with rotation. The rotation in the light presence assumed curve RL at 702 is the perceived rotation by the subject if he has both his visual field and motion sensing apparatus in operation. The curve RL indicates that the subject can reasonably perceive this yaw rotation if he has both visual and motion information. If the subject closes his eyes; however, the rotation in dark curve RD at 704 indicates his perception of the rotation. After 25 seconds the RD curve goes to zero (the subject does not sense rotation because Wy=constant and αy=0) and even goes below zero at 706, indicating a perception of rotation in the opposite direction. Thus a true illusion occurs after 25 seconds if no visual field is available for the subject to get a fix on in terms of an inertial reference frame.

In a simulation of the FIG. 7 illusion the state vector xp1 is the actual state (full visual information) and will track the signal RL. The perceived state xp2, associated with a lack of visual information will track RD. The Kalman filter x̂KF will track xp2 and will also be misguided by the lack of visual field information.

The residuals v1(t) are the difference between xp2 and x̂KF; this will appear as a random white noise sequence. The residuals v2(t) are the difference between xp1 and x̂KF. These residuals are correlated and biased and are not white and random. The v2(t) function in this case is what drives the alarm indicator to ultimately alert the pilot. For this case a TH or threshold value of 0.02 rad./sec would be appropriate as is shown in FIG. 1.

Figure 8:
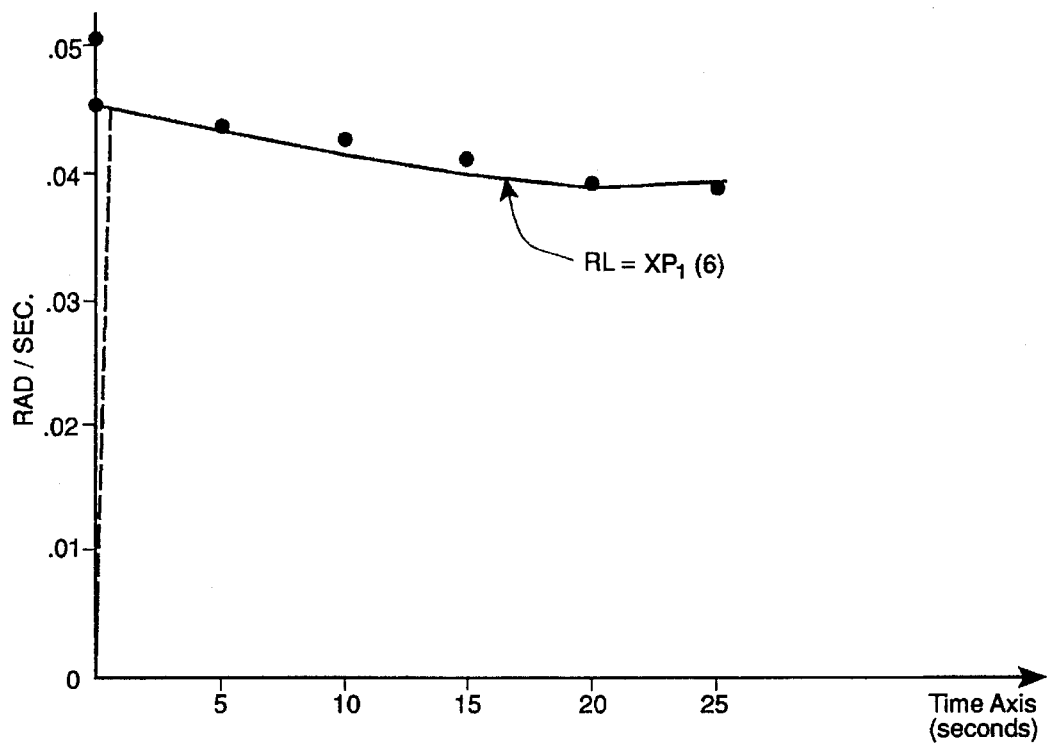
FIG. 8 shows a subject's response to perception of yaw rotation with full visual field for the oculogural illusion.
Figure 9:
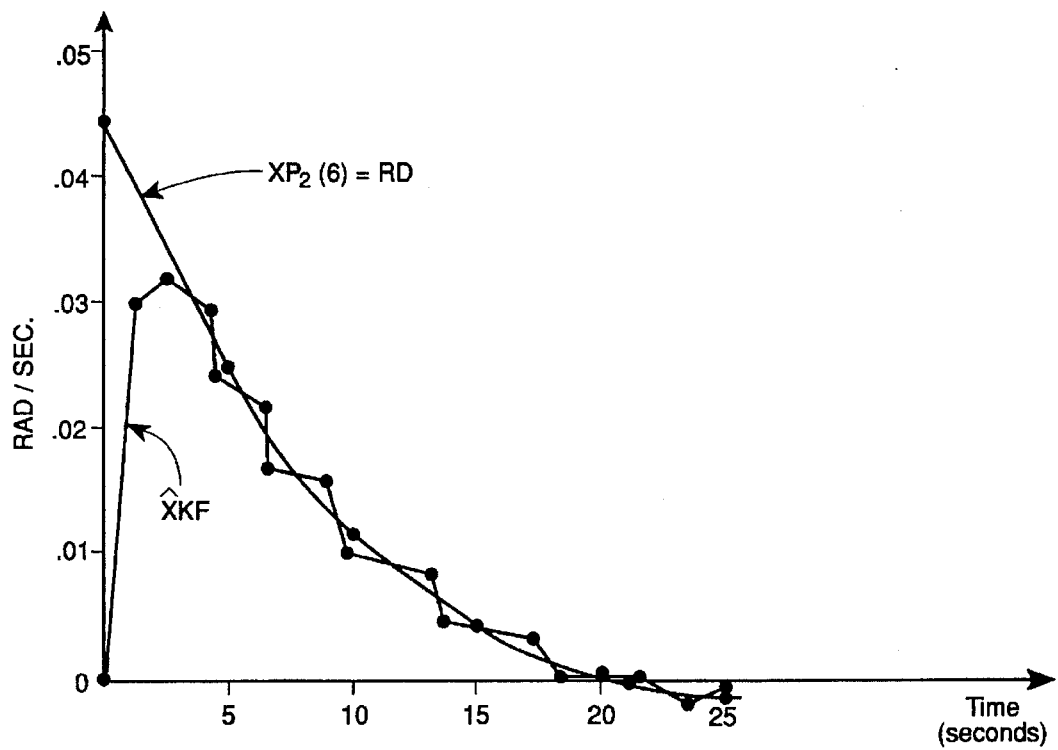
FIG. 9 shows perception of yaw rotation under closed eye conditions for the oculogural illusion, both actual and Kalman filter estimate being shown.

FIG. 8 illustrates a plot of xp1, the full information state vector which is to model the input RL in FIG. 8. The FIG. 8 curve is obtained by simulating an input:

$$\alpha y = 0.045 \text{ rad/sec}^{**}2 \quad 0 < t < 1 \tag{39}$$

$$Wy = 0.43 \text{ rad/sec} \quad 1 < t < 25 \tag{40}$$

the symbol ** 2 in equation 39 indicates an exponent of two, i.e. seconds squared.)

Figure 10:
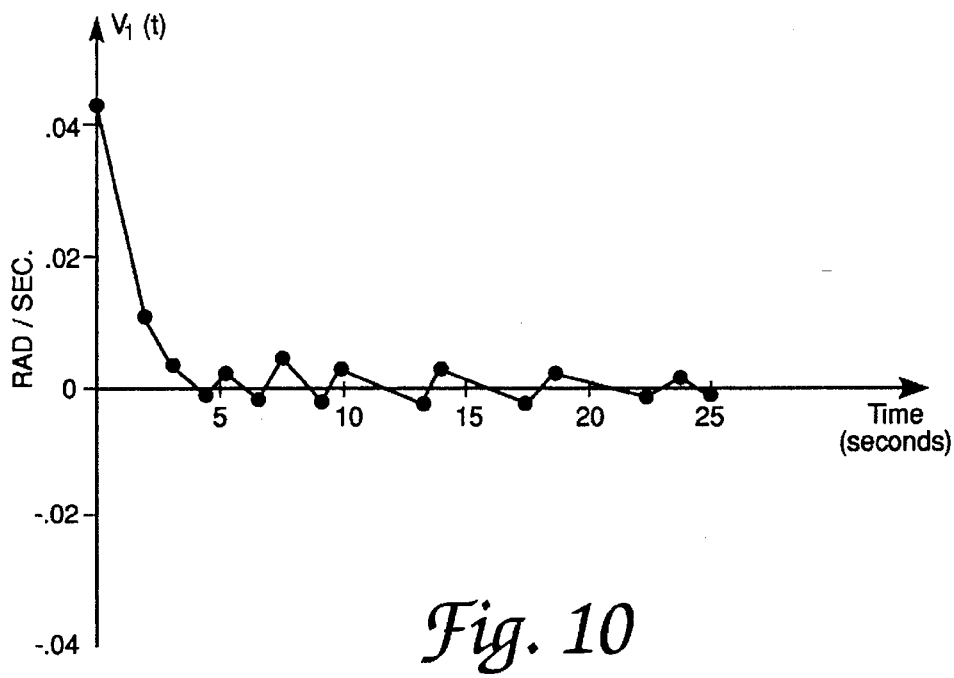
FIG. 10 shows the difference function V1(t) between actually perceived and Kalman filter simulations for the oculogural illusion.
Figure 11:
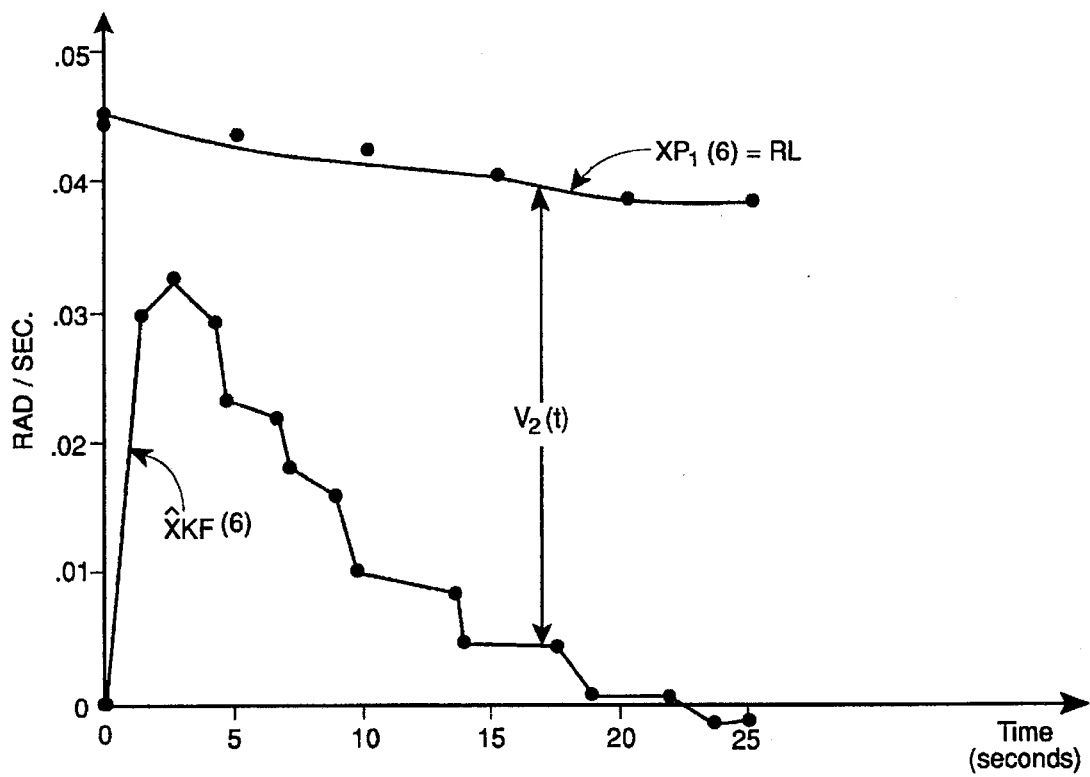
FIG. 11 shows the error V2(t) between actual yaw rotation and the Kalman filter simulation for the oculogural illusion.

To replicate the R stimulus in FIG. 7 (exponent of two, i.e. seconds squared) filter 9 illustrates the unbiased Kalman filter output x̂KF and the state vector xp2 from FIG. 7 which are both lacking the full information of the visual field; clearly the Kalman filter tracks xp2. FIG. 10 illustrates the residuals v1(t) which are the difference between x̂KF and xp2. FIG. 10 also shows how a random noise source should appear, half the time positive, half the time negative. FIG. 11 illustrates a plot of xp1 and x̂KF. Clearly a disparity exists in FIG. 11 between the true system state xp1 and the erroneously perceived state x̂KF.

Figure 12:
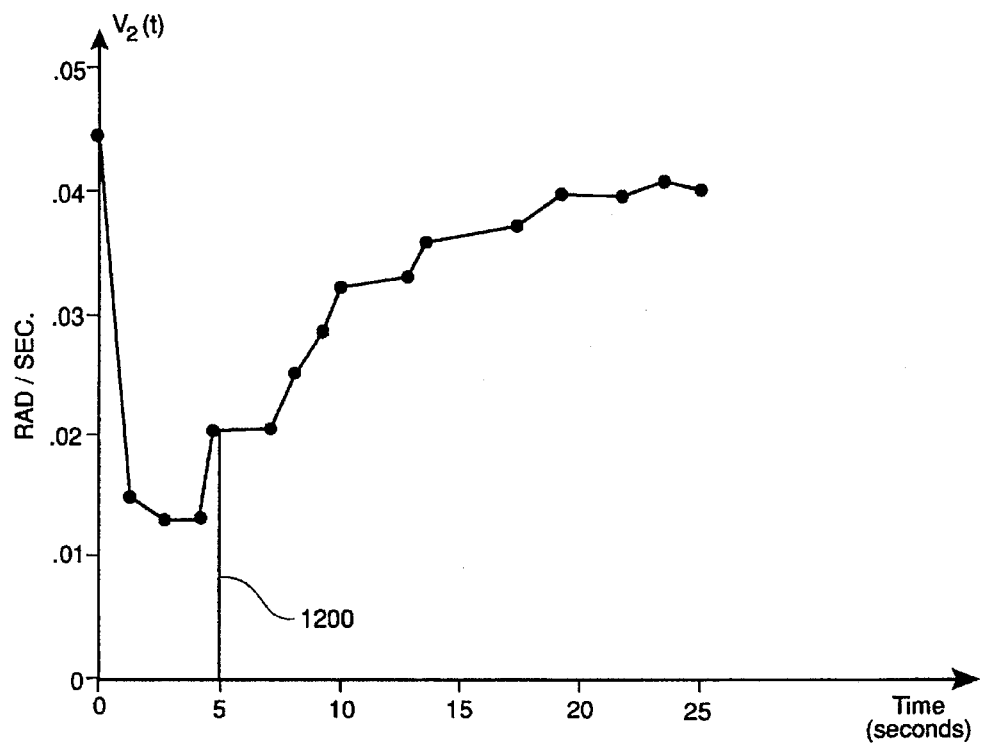
FIG. 12 shows difference between an actual position or orientation and a Kalman filter estimate thereof together with an alarm signal threshold.

FIG. 12 illustrates a plot of the residuals v2(t) which show the disparity between xp1 and x̂KF. At t=5 seconds i.e. at 1200, the residuals v2(t) exceed a threshold of TH=0.2 rad/sec. and initiate an alarm to indicate a potentially disorientating situation to the pilot. Thus, in the absence of other cues, the FIG. 12 disorientation is detected only when the semicircular canals are stimulated.

A second type of illusion occurs when there is a strong linear Gx component only; this occurs when only the otoliths are stimulated, as in an elevator illusion and the canals receive no stimulation. This is because there are no rotation signals, only linear stimulus. Either one of these situations can trigger the SDD of the present invention to produce an alarm for the pilot. In FIG. 11, the residuals which are non-zero can also be caused by erroneous linear responses as well as by erroneous angular response.

Forward acceleration is detected by the otoliths as an elongation and rotation of the specific force vector while the canals continue to signal zero rotation. This commonly occurs, for example, on Navy aircraft carriers, when pilots rapidly accelerate, often in response to catapult force, during takeoff while also under conditions of little visual information such as in dense fog or darkness. Commonly, the accelerated pilot feels erroneously that he or she is pitched up and without visual information is urged to pitch the nose of the aircraft down to correct for this internal feeling. This of course can result in the plane crashing into the water.

Figure 13A:
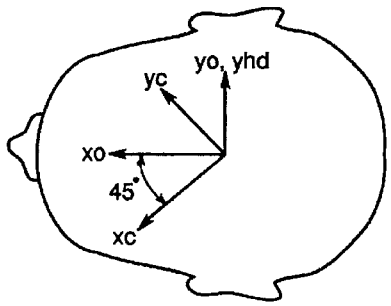
FIG. 13a shows the x-y reference frame for cyclopian and sensor coordinates.
Figure 13B:
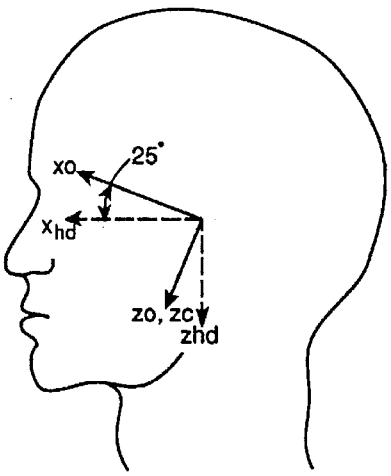
FIG. 13b shows the x z reference frame for cyclopian and sensor coordinates.
Figure 13C:
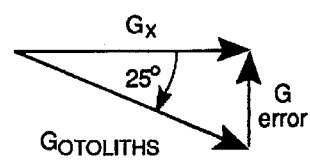
FIG. 13c shows the tilting of otolith sensor coordinates.

To better understand how this occurs with the vestibular system, FIGS. 13a and 13b illustrate a view of the otoliths as they appear in the head centered coordinate system. Assuming again that the otoliths are tilted 25 degrees to the standard Gx direction in the head centered coordinate system as is shown in FIGS. 13b and 13c and that the Gx vector is induced from the forward acceleration, this Gx vector can be decomposed into two vectors G otoliths and G error. Obviously:

$$G \text{ otoliths} = Gx/(\cos(25 \text{ degrees})) \tag{41}$$

and $$G \text{ error} = Gx \tan(25 \text{ degrees}) \tag{42}$$

The component G error is what confuses the pilot and because of G error he senses erroneously that he has pitched up. The pilot is actually feeling a Gz component here when there is only a Gx signal stimulating the otolith system. This is therefore, an illusion caused only by the otolith responses and no canal information is included since the input stimulus was only a linear acceleration. The rotation and the canal responses to this linear input are zero.

Kalman Filter Implementation of The Elevator Illusion

Figure 14A:
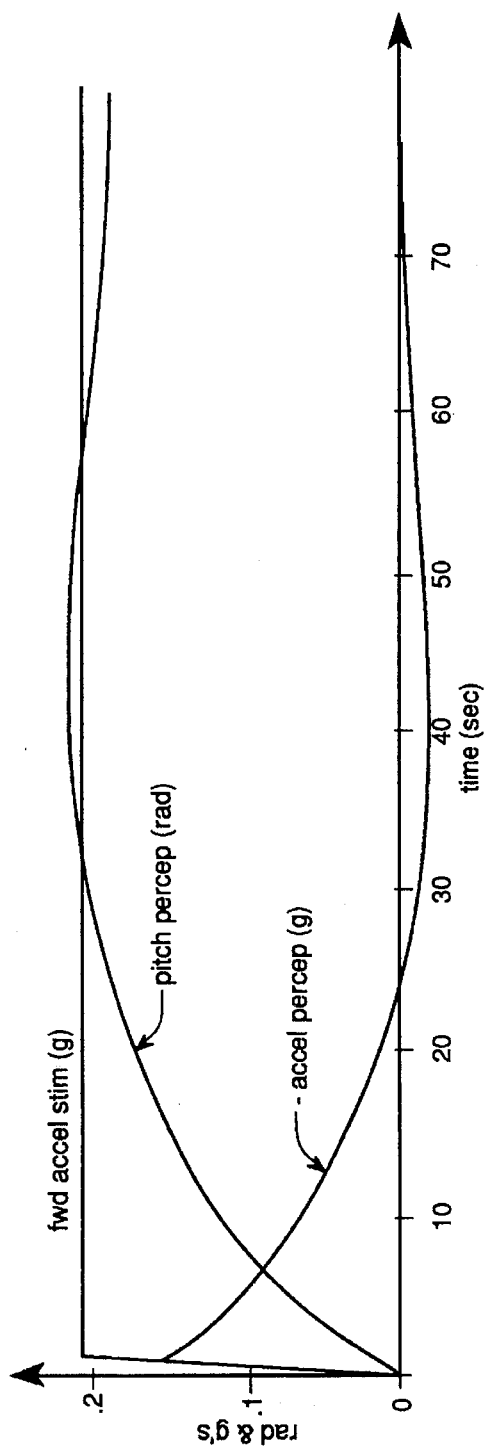
FIG. 14a shows a linear acceleration event together with in-the-dark pilot perception of acceleration and pitch resulting from this acceleration.
Figure 14B:
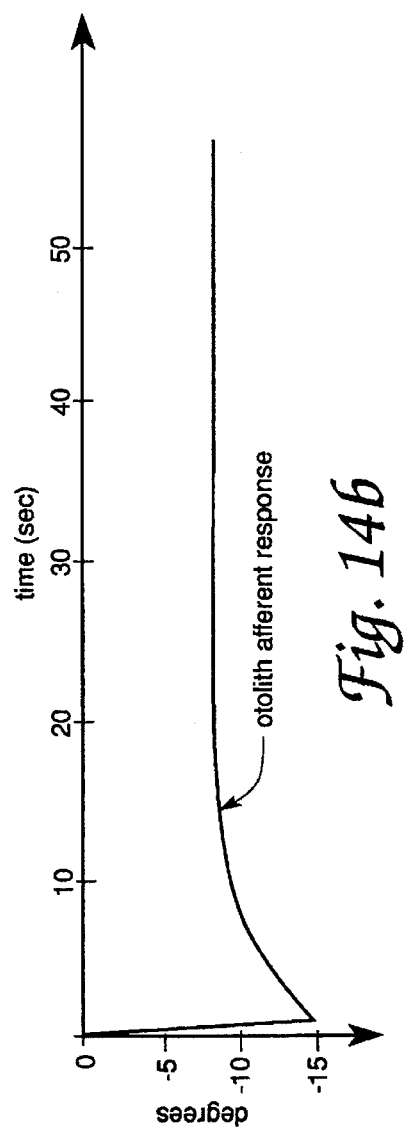
FIG. 14b shows a pilot's otolith afferent response to the FIG. 14a acceleration.

In a simulation of the elevator illusion the state vector xp1 is the actual state referenced to the center of the head coordinate system. xp1 is modeled by the $G_x$ vector with integration of the otolith model in the $G_x$ direction only. The state vector xp2, however, has a Gz component sensed by the otoliths and a $G_x \tan (25 \text{ degrees})$ component in the Gz direction as the G error input to the Z otolith which yields the misperception. FIG. 14, from reference [7], illustrates the pilot's in-the-dark pitch perception, which is erroneous, with the forward acceleration stimulus.

Figure 15A:
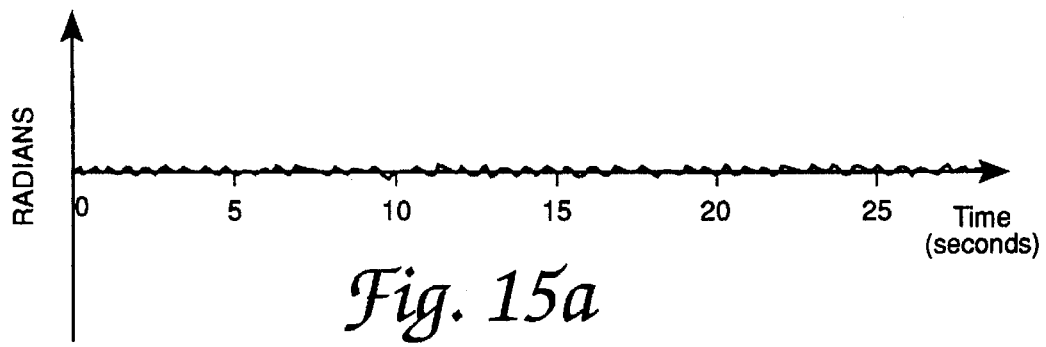
FIG. 15a shows the actual aircraft pitch angle in radians for the state vector xp1 under Gx elevator illusion stress condition.
Figure 15B:
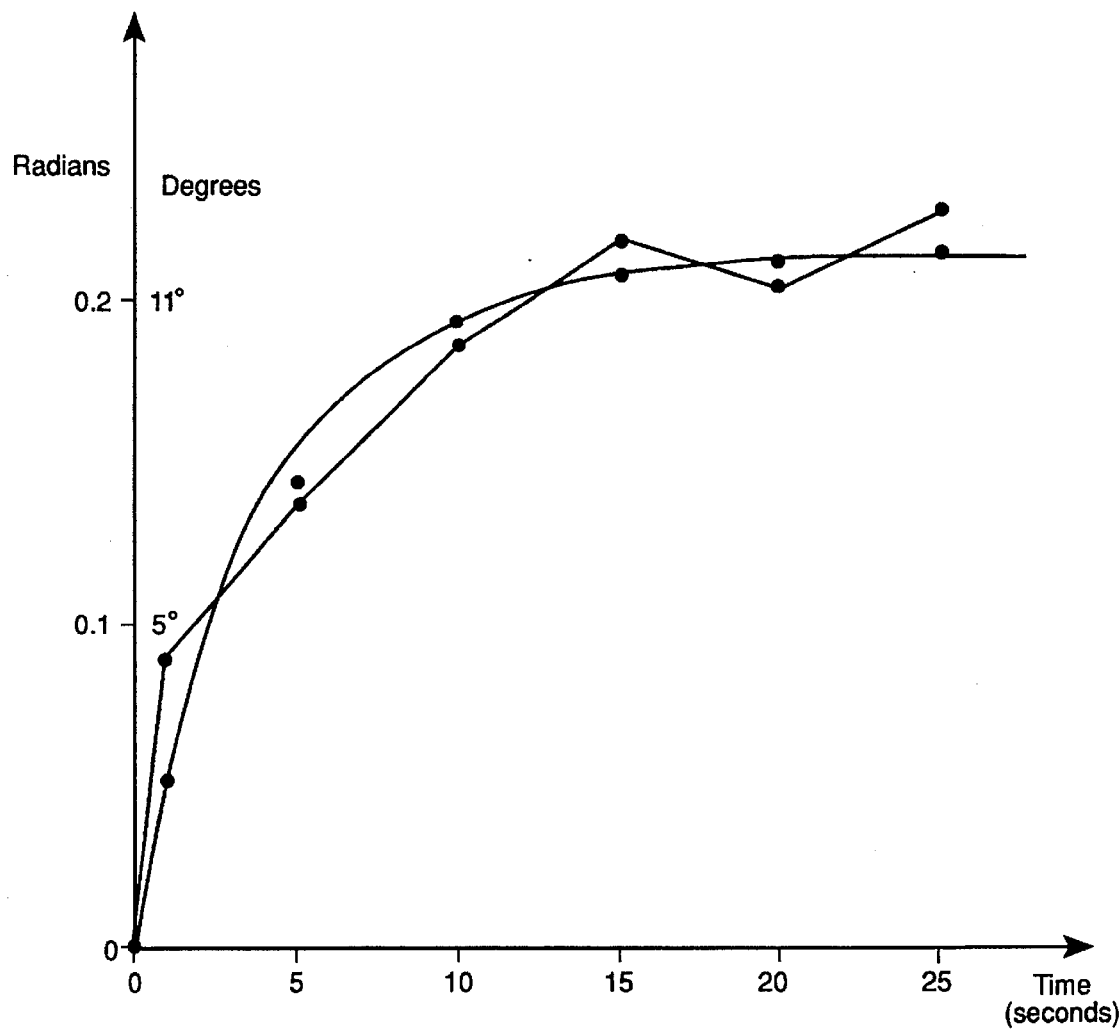
FIG. 15b shows the Kalman filter output with respect to the xp2 true state vector for the elevator illusion.
Figure 16:
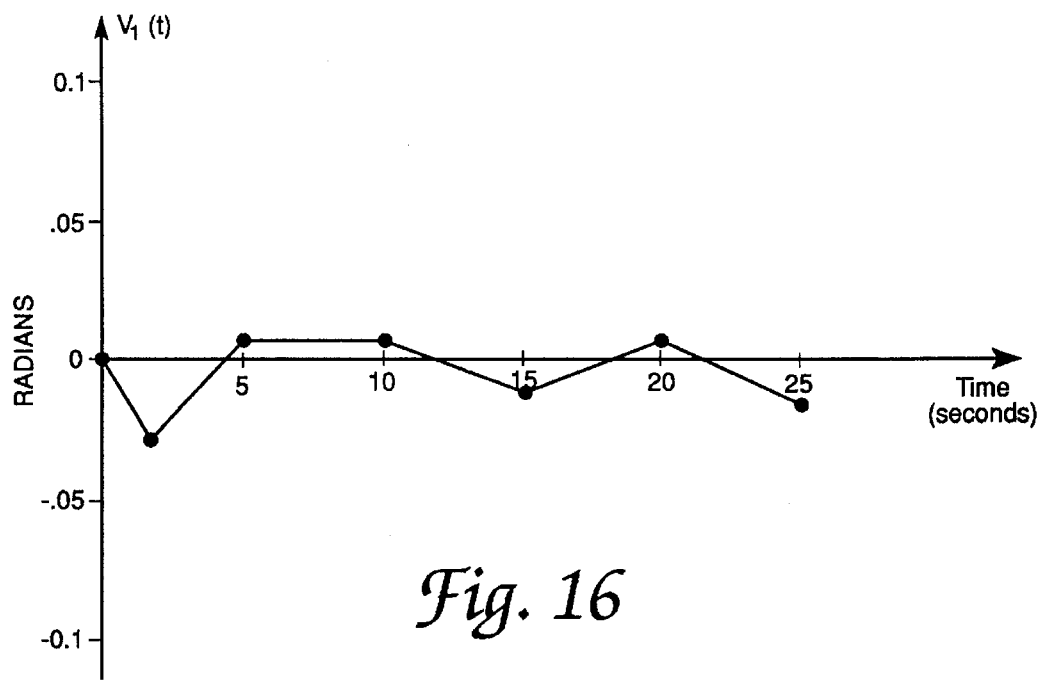
FIG. 16 shows the residual v1(t) between the Kalman filter and the state xp2 for the elevator illusion.

FIG. 15a illustrates a plot of the actual θ pitch i.e., the angle of pitch of the aircraft in radians of the state vector xp1 under a strict $G_x$ stress condition. It is clearly zero. FIG. 15b illustrates the plot of the Kalman filter x̂KF and xp2 in which the x̂KF estimates the otolith's responses in both the Gx and Gz directions. Clearly, FIG. 15b differs from FIG. 15a and there is an illusion present. In FIG. 15b is shown the curve of x̂KF in the z direction and it may be compared (with change of sign) to the pitch perception plot in FIG. 14. Thus the Kalman filter is erroneously sensing the false pitch perception just as the human does because it has the same internal model as the human otolith system, which will make an error in this situation. FIG. 16 is a plot of the residuals v1(t) between the Kalman filter and the state xp2. It appears as a white random process.

Figure 17:
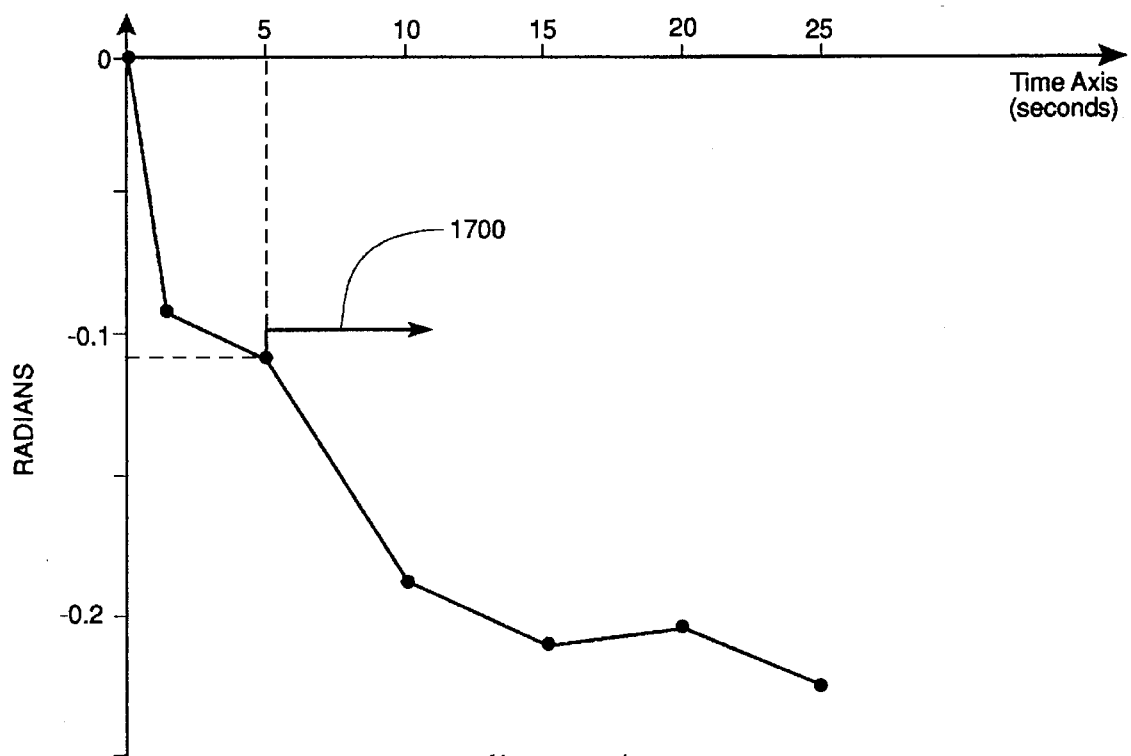
FIG. 17 shows the difference between Kalman filter estimate and actual state for the elevator illusion case.

In FIG. 17, a plot of the residuals v2(t) between xp1 and x̂KF is illustrated. Obviously the bias appears in these residuals and the alarm indicator will be energized at 1700 t=5 seconds, when v2(t) crosses the threshold of TH=-0.11 radians. Thus the SDD device correctly identifies this illusion. It is now desirable to define the decision making process for turning the alarm on and also to define the minimum possible structure of the SDD1 block 100.

Decision Making Process

To turn on an alarm to warn the pilot, there exist two sources of information, each of which may be erroneous: these two sources are based on systems representing otoliths and semicircular canals. These two sources of erroneous information are represented at 1818 in FIG. 18. For the SDD1 device 100, an absence of visual motion is assumed, otherwise the pilot would correct his erroneous motion information from visual field information.

Figure 18:
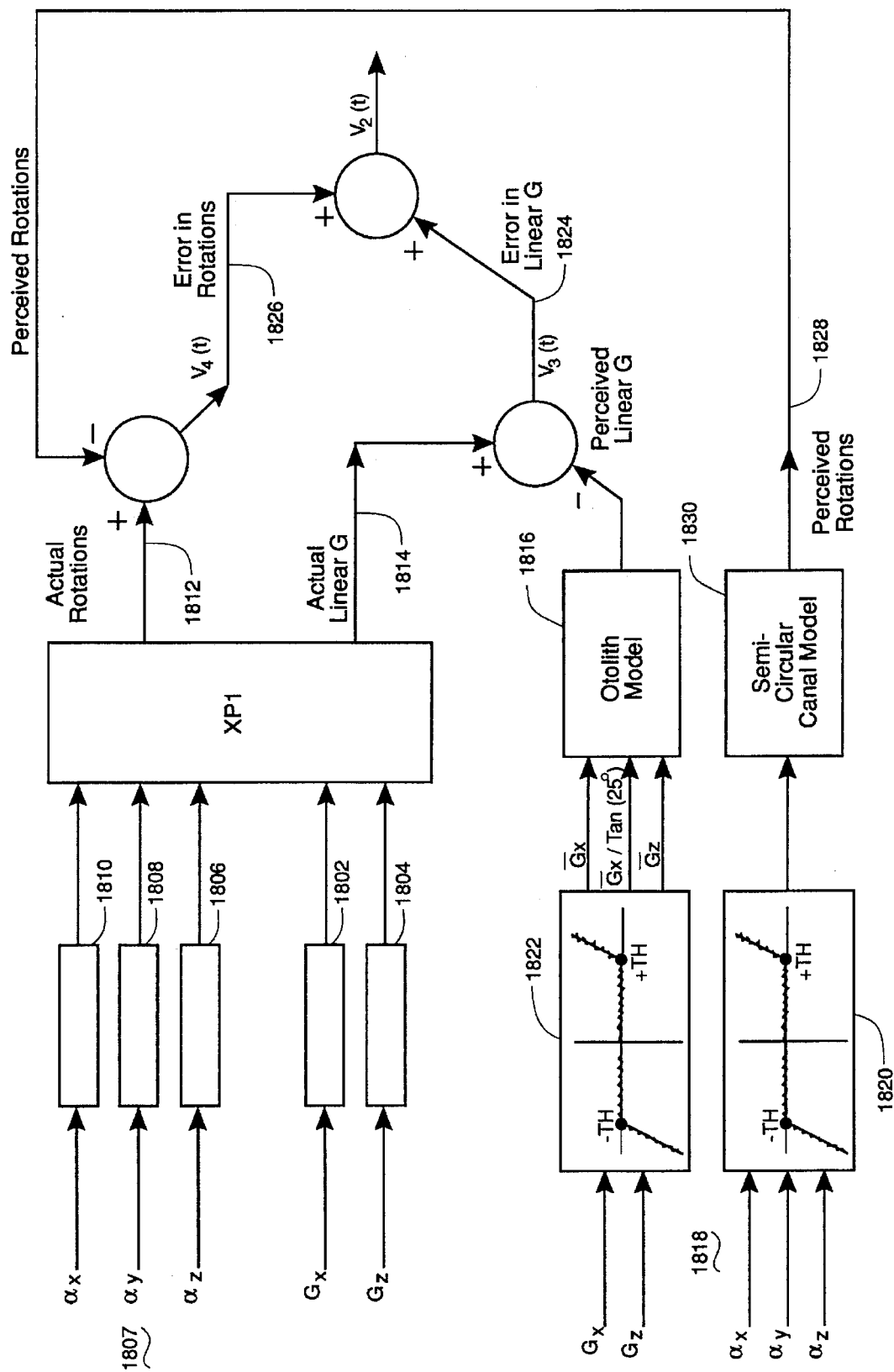
FIG. 18 shows additional details of the spatial disorientation detector first stage in FIG. 1.

FIG. 18 illustrates the basic components of the SDD1 100. For the exact state or good information vector xp1, the otoliths at 1802 and 1804 have the correct inputs $G_x$ and $G_z$. For the semicircular canals 1806, 1808, and 1810 the correct inputs as shown at 1807 are included so that xp1, at the two outputs at 1812 and 1814, represent the true state of the system. In the error inclusive information at the bottom of FIG. 18, a pilot's response dead zone of TH=0.3G is incurred at 1822 before information is preprocessed to the otolith model Kalman filter at 1816. The otolith model inputs include $\bar{G}_x$ into the Gx sensor and also $\bar{G}_x$ tan (25 degrees)=$\bar{G}_x$ into the Gz sensor. This provides distorted information to the filter. This also allows the residuals to grow large and alert the alarm detector for linear G accelerations like the Gx acceleration considered in the elevator illusion previously discussed. For the semicircular canals, the angular accelerations αx, αy, αz enter the 2 to 5 degree per second dead zone simulation 1820. The canal model dynamics at 1830 now work on a reduced set of information in the state xp2.

Two types of residuals arise from this FIG. 18 device. First v3(t) at 1824 is the difference between the true otolith outputs and the perceived otoliths outputs. These residuals v3(t) at 1824 normally are random white noise in nature except e.g., during the elevator illusion. The second type of residuals v4(t) at 1826 is computed from the difference between the true canal outputs at 1812 and the perceived canal outputs at 1828. The residuals 1826 are also normally random white noise in nature except for example, in the case of the oculogyral illusion. The total residuals v2(t) at 116 in FIG. 1 as discussed previously are simply the sum of v3(t) and v4(t). Thus either the otoliths or semicircular canals can trigger the illusion, resulting in v2(t) not being a random white noise signal in nature. In summary, the alarm at 122 in FIG. 1 can be activated either as a result of an erroneous response from the simulated semicircular canals (misperception of rotations) or from the simulated otoliths (a misperception of linear Gx). Linear combinations of these two sensors could present other illusion situations if the residuals v2(t) are not a random white noise process.

Use of the SDD in Relation to Performance Task Situations

There are many incidents of spatial disorientation in which a aircrew member tends to become disoriented more easily when he/she is tasked heavily with complicated performance requirements within the cockpit e.g., see reference [4]. In this situation the pilot pays less and less attention to some motion information sensors because of being so involved with the task at hand. This is called Type I spatial disorientation. The threshold levels or TH values of the canals and otoliths may be used to represent this effect, see reference [1]. With reference to FIGS. 5a–b, in this regard, there generally is a threshold model similar to FIG. 3 in series with each of the inputs αx, αy, αz, Gx, Gy, Gz to preprocess these empirical data. For the semicircular canals, TH usually has a value of 2°/sec2 i.e. two degrees per second per second. Thus, normally, if a pilot is sensing an angular rotation, he/she could not distinguish changes smaller than 2°/sec2. When the pilot is task loaded, however, this threshold value of TH may increase to 5°/sec**2, thus preventing the pilot from processing normal or small change of rotation information (it is apparently ignored).

These effects of task loading can easily be implemented by simply changing the appropriate TH value as by doubling its size when the pilot is task loaded. This can be accomplished in FIG. 18 by simply expanding the TH value in the threshold detectors such as at 1820 and thereby preprocessing the input data for Gx, Gy, Gz, αx, αy, and αz to account for high task load situations Such increase of the TH value may, for example, be accomplished certain conditions occur in the cockpit, such as:

(1) A master caution light or some other warning comes on.

(2) The pilot is selecting a new radio frequency.

(3) Other events similar to (1) and (2) in which it is known that the pilot is distracted with another task.

Minimum Implementation

With respect to the minimum implementation for a Spatial Disorientation Detector or SDD, not all of the states of xp2 are required because visual information is, for example, of no use to the SDD. If a pilot has visual information, he/she is not disoriented because visual field information overrides other motion inputs, no matter how erroneous they are.

Figure 19:
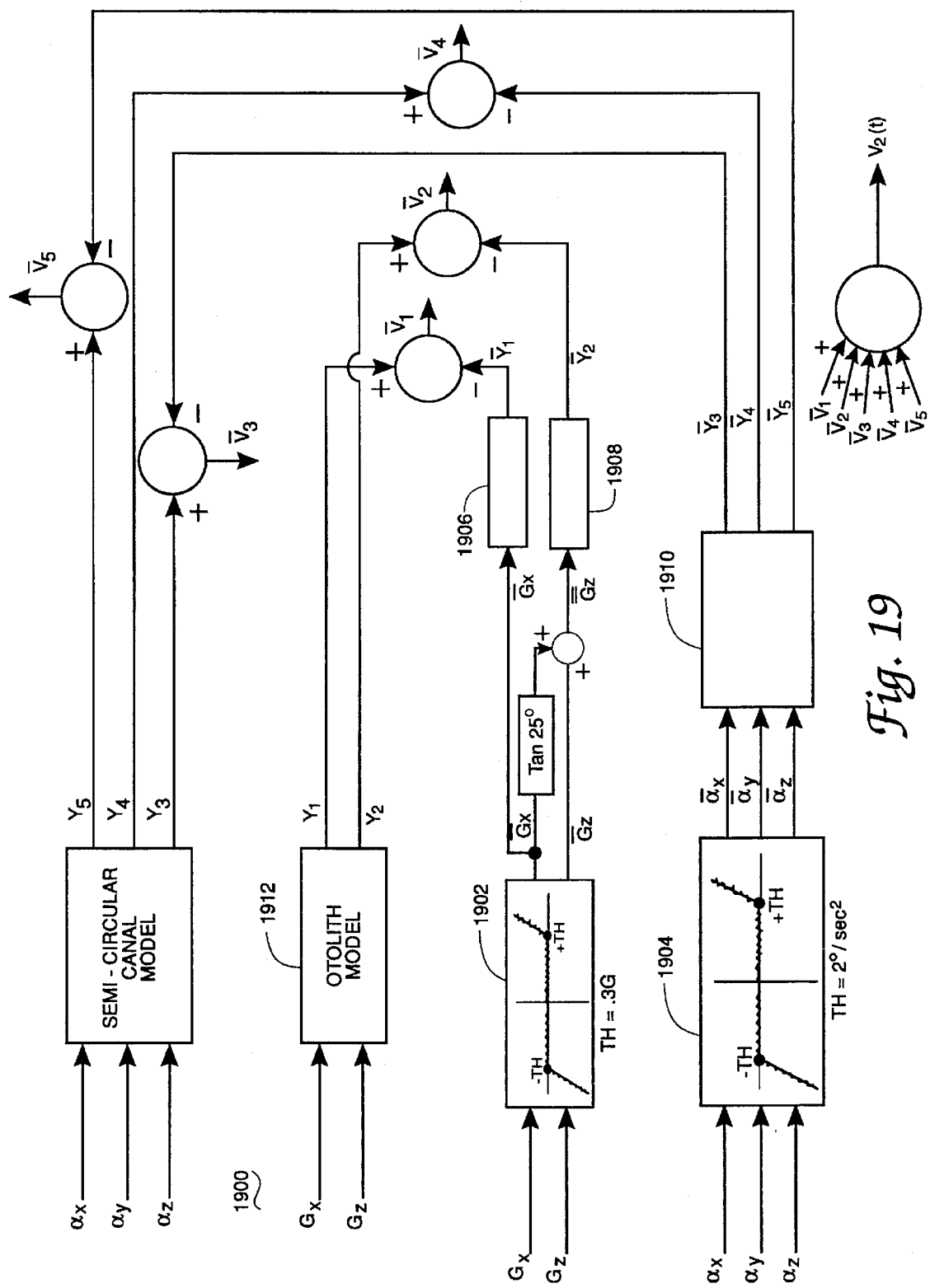
FIG. 19 shows a minimum implementation of the spatial disorientation detector.

FIG. 19 illustrates an overall system view and employs the inputs αx, αy, αz, Gx and Gz. The full information states of xp1 are in the upper part of FIG. 19 at 1900 with outputs $Y_1$, $Y_2$, $Y_3$, $Y_4$, and $Y_5$. These are the correct or good data states of the system. The bottom half of FIG. 19 contains the misperceived states. The linear accelerations Gx and Gz are preprocessed through the threshold (dead zone) function of width TH at 1902. TH normally may be set to 0.3 G or other values which depend on the units of the input data but can be increased if a pilot is known to be overly tasked. The output of the threshold block 1902 is $\bar{G}_x$ and $\bar{G}_z$ which differ from Gx and Gz by the threshold dead zone characteristic. $\bar{G}_z$ is then computed by adding $\bar{G}_z$ to $\bar{G}_x$ (tan (25°)) to describe the interaction. The signals $\bar{G}_x$ and $\bar{G}_z$ are applied to the Kalman filter otolith models at 1906 and 1908 to provide the outputs of $\bar{Y}_1$ and $\bar{Y}_2$, respectively. These outputs are compared to $Y_1$ and $Y_2$ to generate two sets of residuals $\bar{v}_1$ and $\bar{v}_2$.

A similar process is conducted with the semicircular canals. The rotational accelerations αx, αy, and αz are preprocessed through the dead zone of width TH normally= 2°/second**2 at 1904. The outputs of this block are $\overline{αx}$, $\overline{αy}$, and $\overline{αz}$ which have less information than αx, αy, and αz because of the threshold dead zone. The outputs of the semicircular canal model are $\bar{Y}_3$, $\bar{Y}_4$, and $\bar{Y}_5$ which are compared with the true outputs $Y_3$, $Y_4$, and $Y_5$ at 1910 generating the three sets of residuals $\bar{v}_3$, $\bar{v}_4$, and $\bar{v}_5$.

At the bottom of FIG. 19 all the residuals $\bar{v}_1$, $\bar{v}_2$, $\bar{v}_3$, $\bar{v}_4$, $\bar{v}_5$ are added together to generate the residuals $v_2(t)$ that was shown in FIG. 1. Thus the desired arrangement of the SDD is that shown in FIG. 19. The FIG. 19 arrangement is also the minimum required system to detect a spatial disorientation illusion. Analog computer embodiments are disclosed herein for the elements in FIG. 19.

Figure 20:
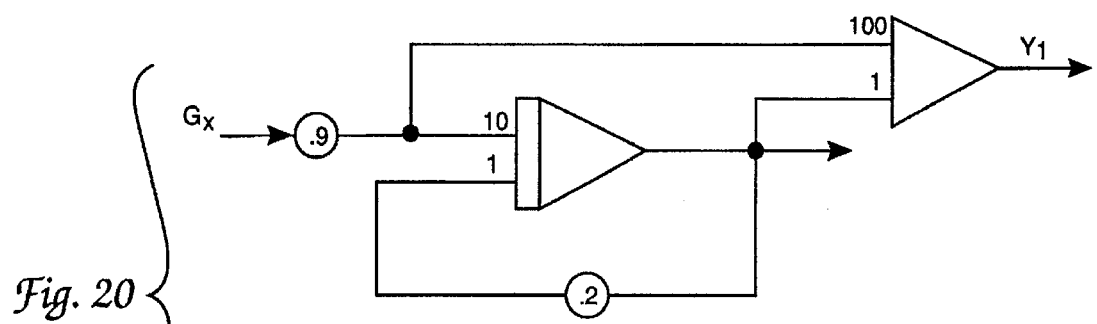
FIG. 20 shows a Kalman filter arrangement for the actual $\overline{Y}_1$, $\overline{Y}_2$, state otolith model in FIG. 19.
Figure 21:
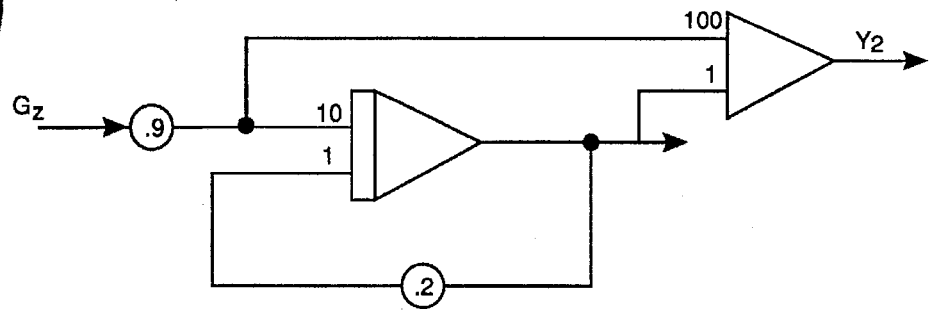
FIG. 21 shows a Kalman filter arrangement for the actual state semicircular canal model in FIG. 19.
Figure 21:
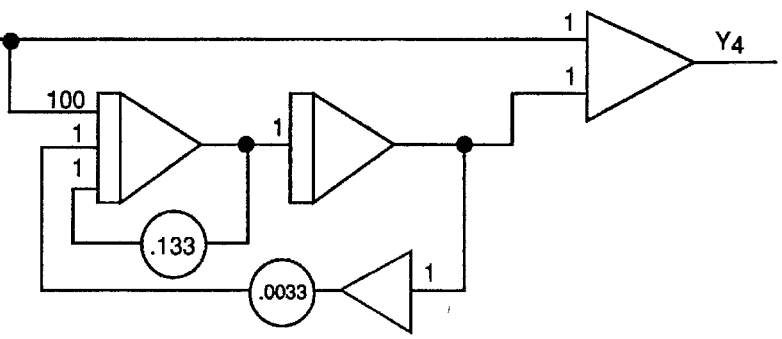

FIG. 20 shows an analog computer embodiment for the $Y_1$ and $Y_2$ Kalman filter otolith model 1912. The FIG. 20 circuit follows from equations 14, 15, and 17 above. FIG. 21 shows the analog computer arrangement to simulate $Y_3$, $Y_4$, $Y_5$ which follows from equations (4) and (6) above. As indicated by the arrows connected to the output terminals of the first operational amplifiers in FIG. 20, the signal output of these amplifiers is also used for inputs into comparators for the perceived otolith models. The arrangements of FIGS. 20 and 21 complete the full information states of the motion sensors.

Figure 22:
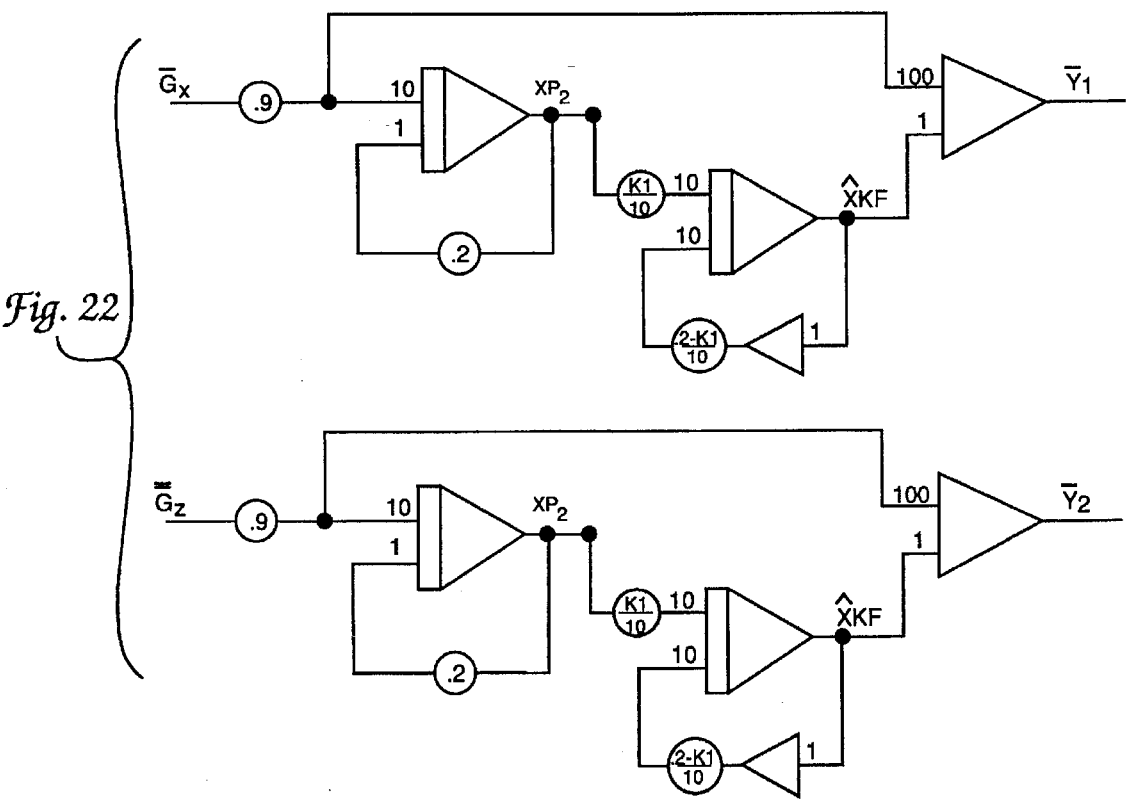
FIG. 22 shows a common filter implementation of the $\overline{Y}_1$, $\overline{Y}_2$ functions in FIG. 19.

FIG. 22 illustrates the two otolith Kalman filter estimators. The inputs are $\bar{G}_x$ and $\bar{G}_z$ which differ from $G_x$ and $G_z$ as shown in FIG. 19. Note the state xp2 is calculated from equation 18. This xp2 must be an input into the Kalman filter because equaitons (27–18) imply:

$$\hat{x}_{Kf} = A\hat{x}_{KF} + K[y - H\hat{x}_{KF}] \quad (43)$$

$$= [A - KH]\hat{x}_{KF} + K[Hxp2 + n(t)] \quad (44)$$

Figure 23:
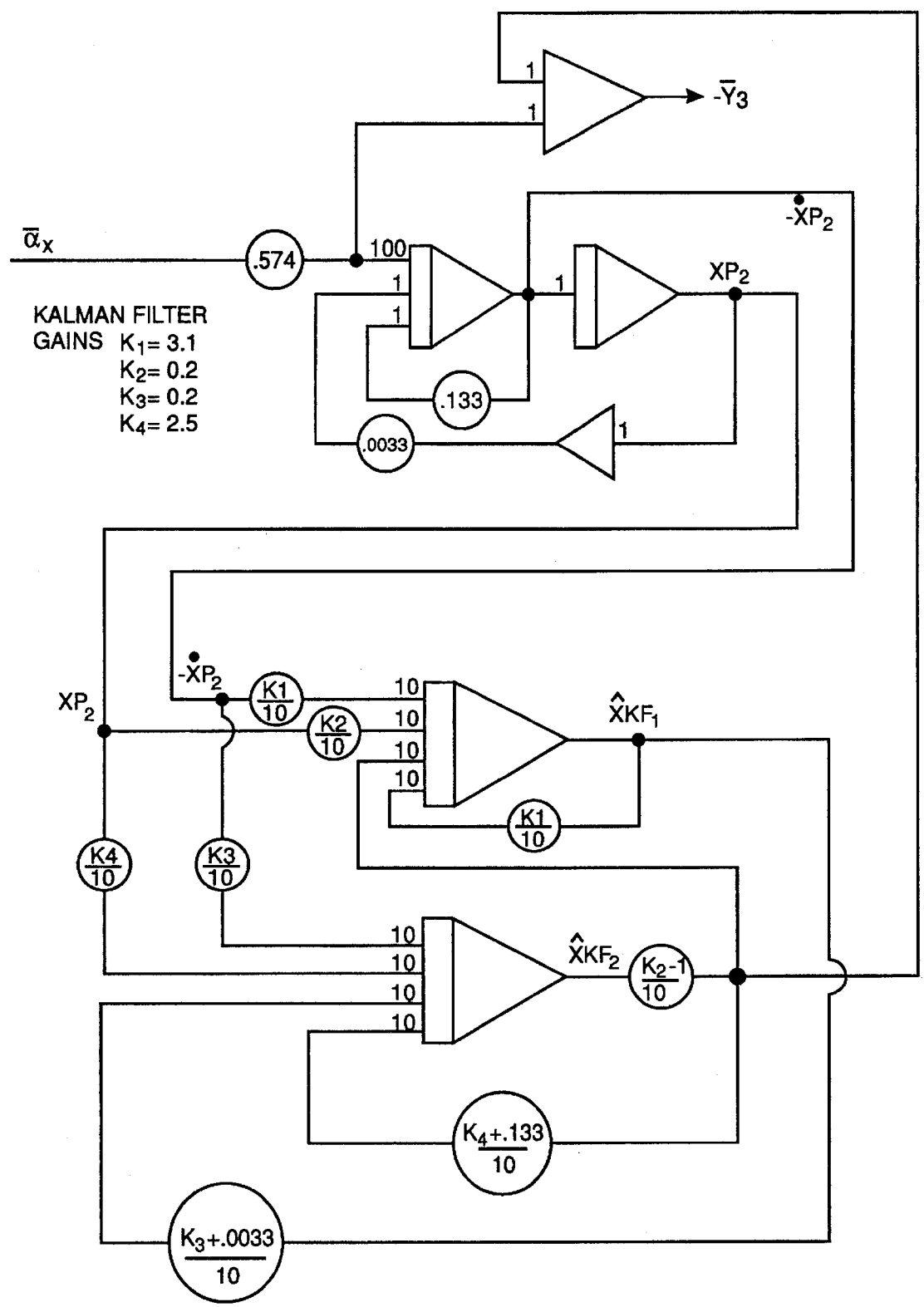
FIG. 23 shows a $\overline{Y}_3$ common filter implementation for FIG. 19.
Figure 24:
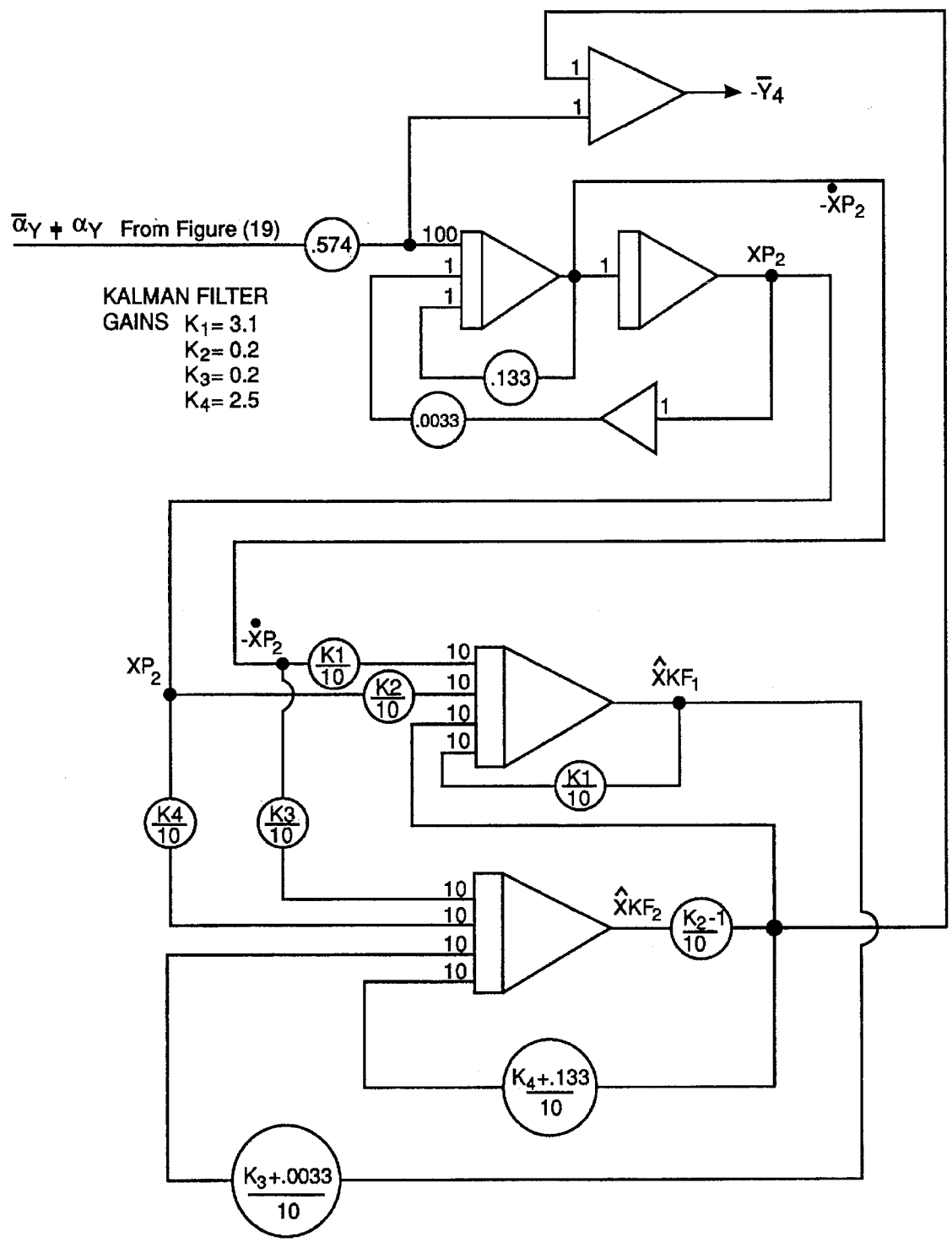
FIG. 24 shows a Kalman filter implementation of $\overline{Y}_4$ in FIG. 19.
Figure 25:
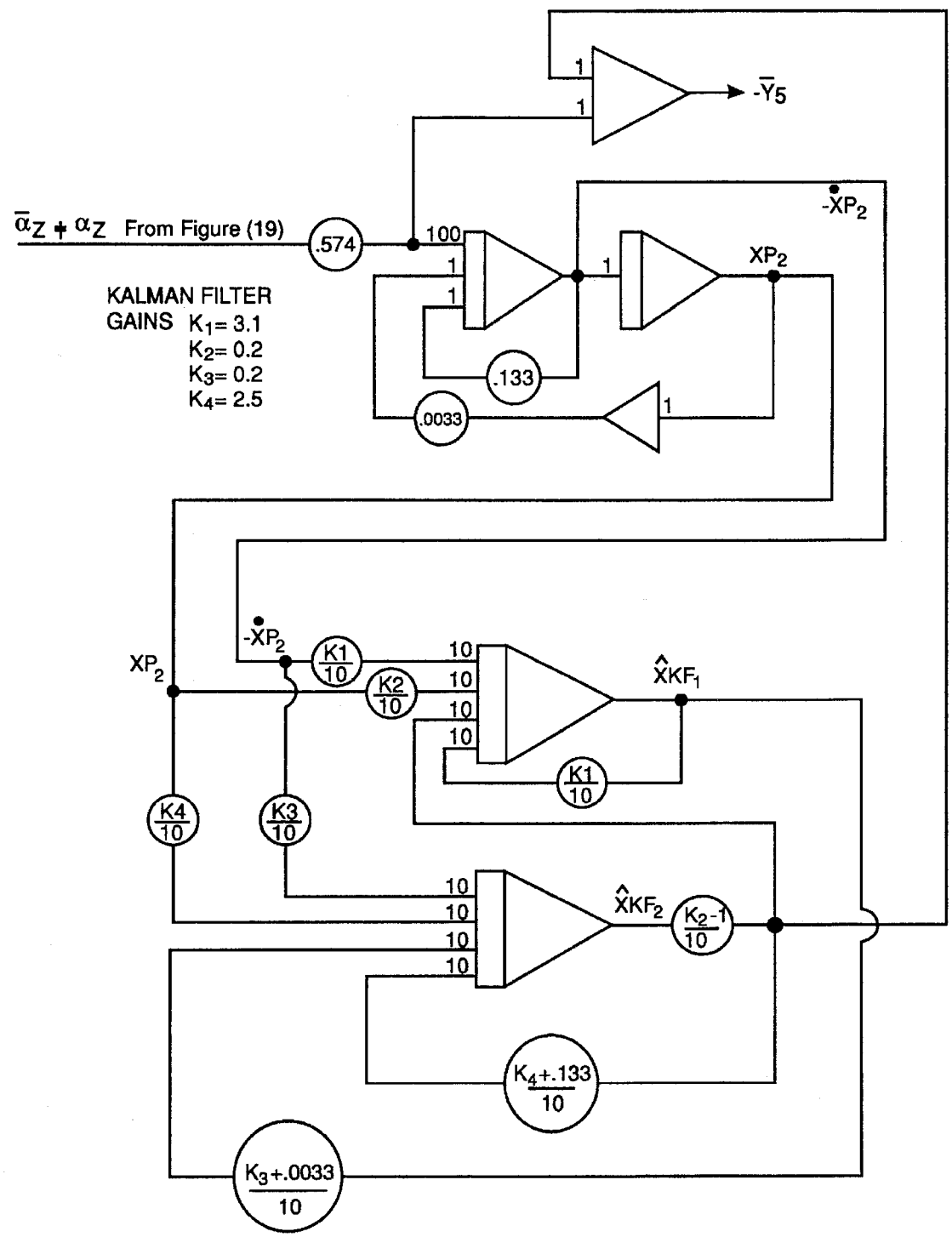
FIG. 25 shows an analog computer implementation of $\overline{Y}_5$ in FIG. 19.

The Kalman gain of K1 (the steady state value is used for simplicity) is appropriate for this simulation and has been calculated previously from equation (32). FIGS. (23–25) show this same simulation for the semicircular canals. Note the inputs are $\overline{αx}$, $\overline{αy}$, $\overline{αz}$ which differ from αx, αy, αz because they contain dead zone, inferior, information. Again, as with the FIG. 20 otolith model, the Kalman filter is implemented via equation (44). In this case the A is a 2×2 matrix and the gain K is a 2×2 matrix. The diagrams in FIGS. 23, 24, 25 are all similar except for the inputs $\overline{αx}$, $\overline{αy}$, and $\overline{αz}$. Normalized residuals $r_i(t)$ for the case of white noise (FIG. 26a) and the case of correlation in the residuals (i.e. non-white noise) in FIG. (26b). The definition of $r_i$ is included in the Appendix and refers to normalized residuals.

The vertical scales 2610 and 2612 in each of these figures represents the 95% confidence interval which is also equal to ±1.96/(N)**½ with N being 30 points in each figure. In FIG. 26a less than 5% or only one point as indicated at 2600 falls outside of the 95% confidence limit range and in FIG. 26b four points as shown at 2602, 2604, 2606, and 2608 or more than 5% of the total points fall outside the 95% confidence limit range.

Thus FIG. 26a is white noise and FIG. 26b is non-white noise by the definition given here. The present invention is therefore believed to provide the first human physiology inclusive system for detecting disorientation inducing environments in an aircraft. Such detector is believed to be of significant safety and human factors improvement for the pilot of especially a tactical military aircraft.

Appendix A—Correlator Operation

Operation of the correlator follows closely the test disclosed in reference [8] to determine if a Kalman filter is "optimal". Given the residuals $v_1(t)$ or possibly $v_2(t)$ a test to determine if these residuals originated with a white random source is desired. The test proceeds as follows (e.g. for the residuals v2(t)).

Step 1: Select n points of $v_2(t)$ sampled every Δt time units. The n points are labeled $v_1, v_2, \ldots vn$.

Step 2: Calculate $\hat{C}o$ (the correlation function for zero shift between the residuals), where:

$$\hat{C}o = 1/n \sum_{i=1}^{n} vi**2 \quad (A.1)$$

Step 3: Now shift the vi elements one sample, and calculate the shifted correlation function C1:

$$\hat{C}l = 1/n \sum_{i=1}^{n} vi(v(i-1)) \quad (A.2)$$

Step 4: Repeat step 3, n times.

Step 5: Now calculate the normalize autocorrelation function. $\hat{r}i$:

$$\hat{r}i = \hat{C}i/\hat{C}o \text{ for } i=1,2,\ldots n \quad (A.3)$$

Step 6: Plot $\hat{r}i$ versus i and check the number of times $\hat{r}i$ is greater than the band with limit ± (1.96/n**½) $\hat{C}o$ (see FIGS. (26a and 26b).

Step 7: If $\hat{r}i$ is outside the band more than 5% of the n values, then the residuals $v_2(t)$ are not white. If $\hat{r}i$ is inside the band less than or equal to 5% of the n values, then the residuals $v_2(t)$ are white. This is a 95% test for whiteness of the residuals. The results of this determination is shown in FIGS. 26a and 26b.

If n values of sampled data are selected, then in order to shift backward or forward, at least 3n points of data need to be available. Thus the whiteness test (e.g. n=10 seconds) will perform only after 30 seconds of data are collected. Typically, with a fast sampling rate (e.g. 1/10 of a second), only 6 seconds of data are required to make the whiteness test every 2 seconds. This is more practical and more easily implemented.

APPENDIX B—REFERENCES (Each hereby incorporated by reference herein)

[1] Borah, J., Young, L. R., and Curry, R. E., "Optimal Estimator Model For Human Spatial Orientation", Annals of The New York Academy of Sciences, vol. 545, New York, N.Y., 1988, pp. 51–73.

[2] Oman C. M., "Motion Sickness: A Synthesis and Evaluation of The Sensory Conflict Theory", Proceedings of Emesis Symposium, 88 Nausea and Vomiting: A Multidisciplinary Perspective, Nov. 13, 1988, Ottawa, Ontario, Canada.

[3] Oman, C. M., "A Heuristic Mathematical Model For The Dynamics of Sensory Conflict and Motion Sickness" ACTA Oto-Laryngolgica, Supplement 392, 1982.

[4] Young, L. R., "Perception of The Body in Space: Mechanisms", Handbook of Physiology-The Nervous System III, Chapter 22.

[5] Kalman, R. E., and Bucy, R. S., "New Results in Linear Filtering and Prediction Theory", *ASME Transactions Journal of Basic Engineering*, March 1961, pp. 95–108.

[6] Gum, D., R., 1973, "Modeling of The Human Force and Motion Sensing Mechanisms", AFHRL-TR-72-54, AD-766 444 U.S. Air Force Human Resources Laboratory, WPAFB, Ohio

[7] Borah, J., L. R. Young, R. E. Curry, "Sensory Mechanism Modeling", AFHRL-TR-78-83, February 1979.

[8] Mehra, R. K., "On The Identification of Variances and Adaptive Kalman Filtering", *IEEE Transactions on Automatic Control*, vol. AC-15, No. 2, April, 1970, pp. 175–184.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Airborne spatial disorientation apparatus for protecting an aircrew member from the effects of aircraft maneuvering related spatial disorientation, said apparatus comprising the combination of:

first means for computing electrical signals representing true position and orientation of said aircraft with respect to an earth reference;

second means, inclusive of dead zone and noise tolerant mathematical models for a plurality of human position and orientation perceiving functions, for computing electrical signals representing aircrew member perceived position and orientation of said aircraft;

means for comparing differences between said true position and perceived position and said true orientation and perceived orientation electrical signals with predetermined difference magnitude limits therefor; and means for informing said aircrew member of instances when said predetermined difference magnitude limits are exceeded.

2. The apparatus of claim 1 wherein said first means for computing and said second means for computing together comprise a first stage portion of said apparatus; and said first stage portion further includes Kalman filter mathematical model means for estimating said aircrew member perceived position and orientation of said aircraft electrical signals.

3. The apparatus of claim 2 wherein said true position and true orientation and said perceived position and perceived orientation electrical signals are vector signals comprised of plural discrete electrical signals each.

4. The apparatus of claim 2 wherein said means for comparing differences includes means for computing difference signals between said Kalman filter estimated member perceived position and orientation electrical signal and said true position and orientation electrical signals.

5. The apparatus of claim 4 wherein said means for computing difference signals includes signal correction means responsive to non-random white noise signal components of said difference signals.

6. The apparatus of claim 1 wherein said human position and orientation perceiving functions Kalman filter mathematical model means includes mathematical models taken from the group consisting of a human visual apparatus responsive orientation perception model, a human vestibular apparatus responsive orientation perception model, a human proprioceptive apparatus responsive orientation perception model, and a human tactile apparatus responsive orientation perception model.

7. The apparatus of claim 6 wherein said Kalman filter mathematical models include each of said visual apparatus responsive, vestibular apparatus responsive, proprioceptive apparatus responsive and tactile apparatus responsive perception models.

8. The apparatus of claim 6 wherein said human vestibular apparatus responsive orientation perceptive model includes otolith and semicircular canal modeling portions.

9. The apparatus of claim 1 wherein said first means for computing and said second means for computing include input information taken from the group consisting of head centered coordinate axis linear acceleration vectors and head centered coordinate axis angular acceleration vectors.

10. The apparatus of claim 1 further including visual means informing said aircrew member of a true orientation of said aircraft for enabling a corrective response to said means for informing.

11. The apparatus of claim 1 further including threshold detector means disposed intermediate said means for comparing and said mean for informing for actuating said means for informing in response to said electrical signal differences exceeding said magnitude limits.

12. Airborne spatial disorientation apparatus for protecting an aircrew member from the effects of aircraft maneuvering related spatial disorientation, said apparatus comprising the combination of:

first means for computing electrical signals representing true position and orientation of said aircraft with respect to an earth reference;

second means, inclusive of dead zone and noise tolerant mathematical models for a plurality of human position and orientation perceiving functions, for computing electrical signals representing aircrew member perceived position and orientation of said aircraft;

said first means for computing and said second means for computing together comprising a first stage portion of said apparatus;

said first stage portion further including Kalman filter mathematical model means for estimating said aircrew member perceived position and orientation of said aircraft electrical signals;

means for comparing differences between said true position and perceived position and said true orientation and perceived orientation electrical signals with predetermined difference magnitude limits therefor;

said means for comparing differences includes means for computing difference signals between said Kalman filter estimated aircrew member perceived position and orientation electrical signals and said true position and orientation electrical signals;

said means for computing difference signals includes signal correction means responsive to non-random white noise signal components of said difference signals; and means for informing said aircrew member of instances when said predetermined difference magnitude limits are exceeded.

* * * * *